United States Patent
Koyanagi et al.

(10) Patent No.: US 6,265,467 B1
(45) Date of Patent: Jul. 24, 2001

(54) ACRYLIC SMC OR BMC, PRODUCTION THEREOF, METHOD FOR PRODUCING ACRYLIC ARTIFICIAL MARBLE, AND THICKENING AGENT

(75) Inventors: Seiya Koyanagi; Katsumi Yonekura; Shinji Saiki; Kentaro Hayashi; Yoshihito Nakahara; Yuichiro Kishimoto, all of Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/537,284

(22) Filed: Mar. 29, 2000

Related U.S. Application Data

(63) Continuation of application No. PCT/JP98/04799, filed on Oct. 23, 1998.

(30) Foreign Application Priority Data

| | | |
|---|---|---|
| Oct. 28, 1997 | (JP) | 9-295572 |
| Oct. 28, 1997 | (JP) | 9-295573 |
| Oct. 28, 1997 | (JP) | 9-295574 |
| Oct. 28, 1997 | (JP) | 9-295575 |
| Dec. 24, 1997 | (JP) | 9-355576 |
| Dec. 24, 1997 | (JP) | 9-355577 |

(51) Int. Cl.$^7$ .................................................. C08K 3/00
(52) U.S. Cl. ................ 523/171; 524/414; 524/418; 524/425; 524/437; 524/445; 524/451; 524/492; 524/494
(58) Field of Search .................. 523/171; 524/425, 524/437, 418, 414, 445, 451, 492, 494

(56) References Cited

U.S. PATENT DOCUMENTS

| | | |
|---|---|---|
| 5,149,776 | 9/1992 | Kushi et al. . |
| 5,356,754 | 10/1994 | Kushi et al. . |

FOREIGN PATENT DOCUMENTS

| | | |
|---|---|---|
| 62215633 | 9/1987 | (JP) . |
| 9-111084 | 4/1997 | (JP) . |

Primary Examiner—Edward J. Cain
(74) Attorney, Agent, or Firm—Oblon, Spivak, McClelland, Maier & Neustadt, P.C.

(57) ABSTRACT

An acrylic SMC or BMC, in which when a polymer powder (C) having a bulk density in the range from 0.1 to 0.7 g/ml, an oil absorption of lin-seed oil in the range from 60 to 200 mi/100 g, a degree of swelling by methyl methacrylate is 16-fold or more and a specific surface area in the range from 1 to 100 m$^2$/g is added as a thickening agent, hot water resistance is improved by using a polymer powder (C1) containing no surfactant, a polymer powder (C2) containing as a constituent component a reactive surfactant, or thickening speed is controlled by using a non-cross linked polymer powder (C3) having a Mw from 100,000 to 2,500,000, a non-crosslinked polymer powder (C4) having a Ma from 2,500,000 to 5,000,000, a crosslinked polymer powder (C5) and a polymer powder (D) having a specific surface area from 0.01 m$^2$/g to 1 m$^2$/g; a production method thereof; a method for producing acrylic artificial marble in which components are extruded by a kneading extruder (9) into given shape; and a thickening agent.

34 Claims, 1 Drawing Sheet

ACRYLIC SMC OR BMC, PRODUCTION THEREOF, METHOD FOR PRODUCING ACRYLIC ARTIFICIAL MARBLE, AND THICKENING AGENT

This application is a Continuation of International Application No. PCT/JP98/04799 Filed on Oct. 23,1998.

TECHNICAL FIELD

The present invention relates to an acrylic SMC (sheet molding compound) or PMC (bulk molding compound) of which controllability of thickening speed is excellent and which has excellent handling property, molding processability and storage stability, and a method for producing the same; a method for producing acrylic artificial marble which gives high productivity and has excellent appearance and hot water resistance; and a thickening agent which has excellent thickening property and hot water resistance.

BACKGROUND ART

Acrylic artificial marble prepared by compounding inorganic fillers such as aluminum hydroxide and the like into an acrylic resin has various prominent functions and properties such as excellent mold appearance, soft feeling, weatherability and the like, and is widely used for counters such as a kitchen counter and the like, washing and dressing stands, waterproof pan, an other architectural uses. These are usually produced by a casting method in which a so-called premix prepared by dispersing inorganic fillers into an acrylic syrup is filled into a mold, and this is cured and polymerized at relatively lower temperature. However, since this acrylic syrup has a lower boiling point, the curing temperature has to be lowered and consequently the molding time becomes longer, therefore, productivity decreases. Further, since the filling property of the premix into a mold is not successful, the shape of a molded article is restricted.

For improving these defects, there has been conventionally effected investigation for producing acrylic artificial marble by heat and compression molding of BMC obtained by thickening a resin syrup with a thickening agent.

For example, Japanese Patent Application Laid-Open (JP-A) No. 5-32720 discloses an acrylic BMC for artificial marble excellent in handling property and molding property, prepared by compounding inorganic fillers and a crosslinked resin power having specific degree of swelling obtained by suspension polymerization into an acrylic syrup obtained by previously dissolving an acrylic polymer in an acrylic monomer.

Further, JP-A No. 6-298883 discloses an acrylic BMC for artificial marble excellent in low constriction property in heat-curing, prepared by compounding organic fillers and a thermoplastic acrylic resin powder into an acrylic syrup obtained by previously dissolving an acrylic polymer in an acrylic monomer, the thermoplastic acrylic resin powder being poor soluble in the syrup.

Further, JP-A No. 6-313019 discloses an acrylic BMC for artificial marble of which cracking in molding is prevented and appearance of the resulting molded article and thickening stability thereof are improved, prepared by compounding a resin powder obtained by spray-drying treatment of a crosslinked polymer obtained by emulsion polymerization into an acrylic syrup obtained by previously dissolving an acrylic polymer in an acrylic monomer.

Further, Japanese Patent Application Publication (JP-B) No. 5-13899 discloses an acrylic BMC for artificial marble of excellent in heat resistance, prepared by compounding inorganic fillers and an acrylic resin powder having a specific molecular weight into an acrylic monomer containing a specific amount of a crosslinking agent.

However, in the methods disclosed in JP-A Nos. 5-32720, 6-298883 and 6-313019, since an acrylic polymer is dissolved in an acrylic monomer to prepare a syrup, number of processes is large and production cost tends to increase. Further, when resin powders disclosed in these publications are used as thickening agents, there is a tendency that aging of a premix for obtaining an acrylic BMC requires a long period of time (about 24 hours) and productivity decreases.

On the other hand, in the method disclosed in JP-B No. 5-13899, an acrylic BMC is obtained directly by mixing an acrylic monomer, inorganic filler and polymer powder not via an acrylic syrup. However, since the mixture is kneaded at a temperature of 60° C. for 30 minutes or more for dissolving the polymer powder and thickening the mixture, long period heat history is required for obtaining the acrylic BMC and storage stability of the resulting acrylic BMC deteriorates. Further, when a grain-like acrylic BMC is going to be obtained by compounding a colored resin particle in this method, the colored resin particle is dissolved during kneading and grain pattern becomes extremely unclear or grain pattern disappears, leading to poor appearance.

To solve these problems, the present inventors have found that when a polymer powder having certain oil absorption, certain degree of swelling and certain specific surface area is used as a thickening agent, there is obtained an acrylic BMC which exhibits high thickening speed, requires no aging and provides clear grain pattern (International Publication WO97/40098).

DISCLOSURE OF INVENTION

The present invention has been accomplished for further improving hot water resistance of the resulting molded article and controllability of thickening speed regarding the above-described thickening agent found by the present inventors.

Namely, an object of the present invention is to provide an acrylic SMC or BMC which is useful for producing a molded article such as acrylic artificial marble and the like excellent in appearance and hot water resistance, and excellent in controllability of thickening speed, handling property, molding processability and storage stability, and a method for producing the same; a method for producing acrylic artificial marble which has high productivity and has excellent appearance and hot water resistance; and a thickening agent which is suitable for them.

The present inventors have investigated for attaining the above-described object, and as a result, have found that acrylic artificial marble excellent in hot water resistance can be produced by using a specific thickening agent, that thickening speed can be controlled and an acrylic SMC or BMC excellent in handling property can be produced by using a specific thickening agent together with other components, and that an acrylic SMC or BMC which has excellent storage stability and exhibits clear grain pattern can be produced continuously with high productivity by kneading a specific thickening agent under specific conditions, completing the present invention.

Namely, the present invention relates to:

An acrylic SMC or BMC comprising an acrylic monomer or acrylic monomer mixture (A), an inorganic filler (B) and a polymer powder (C) having a bulk density in the range from 0.1 to 0.7 g/ml, an oil absorption of linseed oil in the range from 60 to 200 ml/100 g, a degree of swelling by methyl methacrylate is 16-fold or more and a specific surface area in the range from 1 to 100 m$^2$/g, further, optionally an inorganic filler-containing resin particle (E), wherein the polymer powder (C) contains a polymer powder (C1) containing no surfactant and/or a polymer powder (C2) containing as a constituent component a reactive surfactant;

or wherein the polymer powder (C) contains at least two components selected from a non-crosslinked polymer powder (C3) having a weight-average molecular weight in the range from 100,000 to 2,500,000, a non-crosslinked polymer powder (C4) having a weight-average molecular weight in the range from 2,500,000 to 5,000,000 and a crosslinked polymer powder (C5);

An acrylic SMC or BMC comprising an acrylic monomer or acrylic monomer mixture (A), an inorganic filler(B), a polymer powder (C) having a bulk density in the range from 0.1 to 0.7 g/ml, an oil absorption of linseed oil in the range from 60 to 200 ml/100 g, a degree of swelling by methyl methacrylate is 16-fold or more and a specific surface area in the range from 1 to 100 m$^2$/g and a polymer powder (D) having a specific surface area in the range from 0.01 m$^2$/g to 1 m$^2$/g, further, optionally an inorganic filler-containing resin particle (E);

A method for producing an acrylic SMC or BMC comprising mixing uniformly the above-described component (A), component (B) and component (C), further, optionally the component (E) and thickening the mixture to give a dough-like material, then, extruding the material into a desired shape, wherein as the component (C), at least two components selected from the above-described component (C3), component (C4) and component (C5) are used together;

A method for producing an acrylic SMC or BMC comprising mixing uniformly the above-described component (A), component (B), component (C) and component (D), further, optionally the component (E) and thickening the mixture to give a dough-like material, then, extruding the material into a desired shape;

A method for producing an acrylic SMC or BMC comprising kneading the above-described component (A), component (B) and component (C), further, optionally the component (E) and thickening the mixture at a temperature in the range from 20 to 60° C. within 20 minutes, or a batch-wise method in which the mixture is thickened by aging, then, the resulted thickened material is extruded continuously into a desired shape;

A method for producing an acrylic SMC or BMC comprising mixing uniformly the above-described component (A), component (B) and component (C), further, optionally the component (E) and thickening simultaneously the mixture at a temperature in the range from 20 to 70° C. to give a dough-like material before extruding the material within 20 minutes, to continuously obtain a desired shape, or a method in which a polymer powder which is thickened in a short period of time is used, and a material which is thickened simultaneously with mixing is immediately extruded to continuously give shape;

A method for producing acrylic artificial marble in which the above-described acrylic SMC or BYE is cured with heating and compressing;

A thickening agent comprising a polymer powder (C2) which has a bulk density in the range from 0.1 to 0.7 g/ml, an oil absorption of lin-seed oil in the range from 60 to 200 ml/100 g, a degree of swelling by methyl methacrylate is 16-fold or more and a specific surface area in the range from 1 to 100 m$^2$/g, and contains as a constituent component a reactive surfactant; and A thickening agent comprising a polymer powder (C1) which has a bulk density in the range farm 0.01 to 0.7 g/ml, an oil absorption of lin-seed oil in the range from 60 to 200 ml/100 g, a degree of swelling by methyl methacrylate is 16-fold or more and a specific surface area in the range from 1 to 100 m$^2$/g, and contains no reactive surfactant.

BEST MODE FOR CARRYING OUT THE INVENTION

Figure 1:
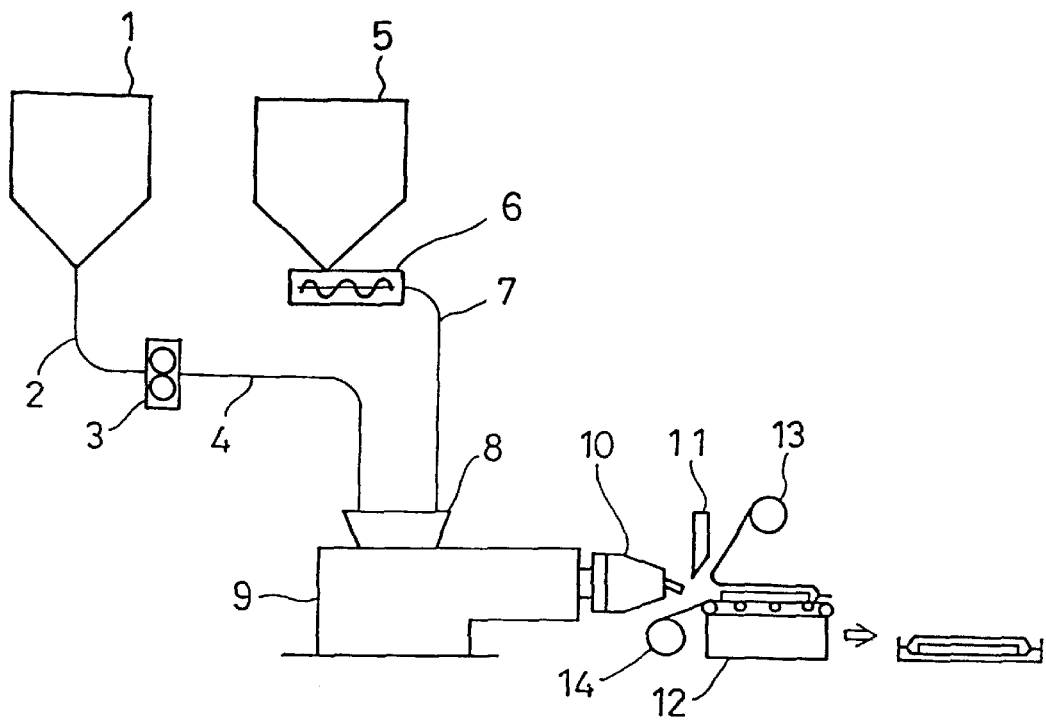
FIG. 1 is a schematic view showing one example of the method for continuously producing a SMC or BMC of the present invention.

The acrylic monomer or acrylic monomer mixture (A) used in the present invention is a component which gives suitable flowability in molding an acrylic SMC or BMC The content of the component (A) is not particularly restricted, and preferably in the range from 5 to 80% by weight based on 100% by weight of the acrylic SMC or BMC of the present invention. When this content is 5% by weight or more, the flowability of the acrylic SMC or BMC tends to be excellent. When it is 80% by weight or less, shrink in curing tends to decrease. The lower limit of this content is more preferably 10% by weight or more, and particularly preferably 15% by weight or more. The upper limit of this content is more preferably 50% by weight or less, and particularly preferably 40% by weight or less.

The acrylic monomer as the component (A) is a monomer having a methacryloyl and/or acryloyl group, and is not particularly restricted. Examples thereof include monofunctional monomers such as methyl methacrylate, alkyl (meth) acrylates carrying an alkyl group having 2 to 20 carbons, (meth)acrylates carrying an ester group having a cyclohexane ring such as cyclohexyl (neth)acrylate and the like, (meth)acrylates carrying an ester group having a bicyclo ring such as isobonyl (meth)acrylate and the like, (meth) acrylates carrying an ester group having a tricyclo ring such as tricyclodecanyl (neth)acrylate and the like, (meth) acrylates carrying an ester group having a cyclic ether structure such as glycidyl (meth)acrylate, tetrahydrofurfuryl (meth)acrylate and the like, hydroxyalkyl (meth)acrylates carrying a hydroxyalkyl group having 1 to 20 carbon atoms, (meth)acrylates carrying an ester group having an aromatic ring such as benzyl (meth)acrylate and the like, (meth) acrylates carrying an ester group having a fluorine atom such as 2,2,2-trifluoroethyl (meth)acrylate and the like, (mth) acrylic acid, metal salts of (meth)acrylic acid, (meth) acrylamides, and the like; and polyfunctional monomers such as ethylene glycol di(meth)acrylate, polyethylene glycol di(meth)acrylate, propylene glycol di(meth)acrylate, 1,3-butylene glycol di(meth)acrylate, 1,4-butylene glycol di(meth)acrylate, polybutylene glycol di(meth)acrylate, 1,6-hexanediol di(meth)acrylate, dimethylolethane di(meth) acrylate, 1,1 dimethylpropane di(meth)acrylate, 2,2-dimethylolpropane di(meth)acrylate, trimethylolethane tri (meth)acrylate, trimethylolpropane tri(meth)acrylate, tetramethylolmethane tri(meth)acrylate, tetramethylolmethane di(meth)acrylate, neopentyl glycol di(meth) acrylate, polyvalent esters of (meth)acrylic acid with polyhydric alcohol [for example, pentaerythritol, dipentaerythritol and the like], allyl (meth)acrylate and the like. These can be used alone or in combination of two or more depending on occasion. In this specification, the term "(meth)acrylate" means "acrylate and/or methacrylate".

Particularly, if methyl methacrylate is contained in the component (A), the appearance of the resulting molded article preferably tends to be excellent. The content of methyl methacrylate is not particularly restricted, and preferably in the range from 1 to 20% by weight based on 100% by eight of the acrylic SMC or BMC. The lower limit of this content is more preferably 5% by weight or more, and the upper limit of this content is more preferably 15% by weight or less.

The acrylic monomer mixture as the component (A) may be a mixture of an acrylic monomer with a monomer other than the acrylic monomer. Examples of the monomer other than the acrylic monomer include aromatic vinyls such as styrene, divinylbenzene and the like, vinyl acetate, (meth) acrylonitrile, vinyl chloride, maleic anhydride, maleic acid, maleate, fumaric acid, fumarate and the like.

For imparting properties such as heat resistance, hot water resistance, strength, solvent resistance, dimension stability and the like to a molded article obtained using the acrylic SMC or BMC of the present invention, it is preferable that a polyfunctional monomer is contained in the component (A). In this case, the content of the polyfunctional monomer is not particularly restricted, and preferably in the range from 1 to 30% by weight based on 100% by weight of the acrylic SMC or BMC for obtaining the above-described effects more effectively. The lower limit of this content is more preferably 3% by weight or more and the upper limit is more preferably 20% by weight or less.

Particularly, when neopentyl glycol dimethacrylate and/or 1,3-butylene glycol dimethacrylate is used as the polyfunctional monomer, a molded article having extremely excellent surface gloss and hot water resistance is preferably obtained. In this case, neopentyl glycol dimethacrylate and/or 1,3-butylene glycol dimethacrylate may be used together with other polyfunctional monomer.

The acrylic monomer mixture (A) may be a syrup containing an acrylic polymer. This syrup may be one which contains in the components (A) a polymer component formed by partial polymerization of the above-described acrylic monomer or acrylic monomer mixture. Alternatively, the syrup may be one which is obtained by polymerizing the above-described acrylic monomer or acrylic monomer mixture by a known method such as bulk polymerization, solution polymerization, suspension polymerization, emulsion polymerization and the like to obtain an acrylic polymer and by separately dissolving this acrylic polymer in the component (A).

As described above, the acrylic monomer mixture (A) may be a syrup containing an acrylic polymer, however, use of an acrylic monomer mixture as it is is preferable since the process for preparing a syrup can be deleted and productivity increases.

The inorganic filler (B) used in the present invention is a components which imparts granite-like texture and heat resistance to a molded article obtained by molding an acrylic SMC or BMC.

The content of the component (B) is not particularly restricted, and preferably in the range from 20 to 80% by weight based on 100% by weight of an acrylic SMC or BMC. When this content is 20% by weight or more, the texture, heat resistance and the like of the resulting molded article tends to be excellent, and shrink in curing tends to decrease. On the other hand, when it is 80% by weight or less, the flowability of an acrylic SMC or BMC tends to be excellent. The lower limit of this content is more preferably 30% by weight or more, and particularly preferably 40% by weight or more. The upper limit of this content is more preferably 75% by weight or less, and particularly preferably 70% by weight or less.

The inorganic filler (B) is not particularly restricted, and examples thereof include aluminum hydroxide, silica, amorphous silica, calcium carbonate, barium sulfate, titanium oxide, calcium phosphate, talc, clay, glass powder and the like. These may be appropriately used if necessary. Among them, aluminum hydroxide, silica, amorphous silica and glass powder are preferable from the viewpoint of texture of the resulted molded article.

The polymer powder (C) used in the present invention functions successfully as a thickening agent. This polymer powder has a bulk density in the range from 0.1 to 0.7 g/ml, an oil absorption of linseed oil in the range from 60 to 200 ml/100 g, a degree of swelling by methyl methacrylate is 16-fold or more and a specific surface area in the range from 1 to 100 $m^2/g$.

When the bulk density of the polymer powder is 0.1 g/ml or more, the polymer powder is not easily splashed, yield in production thereof increases, dusting in adding and mixing the polymer powder decreases, and workability becomes excellent. When it is 0.7 g/ml or less, sufficient thickening effect can be obtained with a small amount of the polymer powder used, and thickening is carried out in a short period of time, therefore, productivity increases, and cost becomes advantageous. The lower limit of the bulk density is more preferably 0.15 g/ml or more, particularly preferably 0.2 g/mi or more. The upper limit of the bulk density is more preferably 0.65 g/ml or less, particularly preferably 0.6 g/ml or less.

When the polymer powder has an oil absorption of linseed oil of 60 ml/100 g or more, sufficient thickening effect can be obtained with a small amount of the polymer powder used, and thickening is carried out in a short period of time, therefore, productivity increases, and cost becomes advantageous. Further, in this case, when an acrylic SMC or BMC containing this polymer powder is used for producing granite-like artificial warble, clearness of grain pattern tends to be excellent. The reason for this is that since this polymer powder absorbs an acrylic monomer in large amount, swelling of an inorganic filler-containing resin particle which is an agent for imparting grain pattern, by an acrylic monomer is suppressed. When this oil absorption is 200 ml/100 g or less, the disposability of the polymer powder becomes excellent, and kneading property in producing an acrylic SMC or B becomes excellent. The lower limit of this oil absorption is more preferably 70 ml/100 g or more, particularly preferably 80 ml/100 g or more. The upper limit is more preferably 180 ml/100 g or less, particularly preferably 140 ml/100 g or less.

Further, when the degree of swelling of the polymer powder by methyl methacrylate is 16-fold or more, thickening effect is sufficient. This degree of swelling is more preferably 20-fold or more.

Further, when the specific surface area of the polymer powder is 1 $m^2/g$ or more, sufficient thickening effect is obtained with a small amount of the polymer powder used, thickening is possible in a short period of time, and productivity of an acrylic SMC or BMC increases. When the specific surface area of the polymer powder is 100 $m^2/g$ or less, the disposability of the polymer powder in an acrylic monomer becomes excellent, and the kneading property of an acrylic SMC or BMC becomes excellent. The lower limit of the specific surface area is more preferably 3 m$^2$/g or more, particularly preferably 5 m$^2$/g or more.

The average particle size of the polymer powder (C) is not particularly restricted, and preferably in the range from 1 to 250 μm. When the average particle size is 1 μm or more, there is a tendency that the dusting of the powder decreases and the handling property of the polymer powder becomes excellent, and when the average particle size is 250 μm or less, there is a tendency that the appearance of the resulting molded article, particularly gloss and surface smoothness thereof become excellent. The lower limit of this average particle size is more preferably 5 μm or more, particularly preferably 10 μm or more. The upper limit thereof is more preferably 150 μm or less, particularly preferably 100 μm or less.

The polymer powder (C) is preferably a secondary agglomerate obtained by mutual agglomeration of a primary particle. When the polymer powder is in the form of a secondary agglomerate, there is a tendency that an acrylic monomer component is absorbed at high speed and thickening property is extremely excellent.

In this case, the average particle size of the primary particle of the polymer powder is preferably in the range from 0.03 to 1 μm. When the average particle size of the primary particle is in the range from 0.03 to 1 μm, there is a tendency that sufficient thickening effect is obtained with a small amount of the polymer powder used, thickening is possible in a short period of time at room temperature, and productivity increases. The lower limit of this average particle size of the primary particle is more preferably 0.07 μm or more. The upper limit thereof is more preferably 0.7 μm or less.

The content of the component (C) is not particularly restricted, and preferably in the range from 1 to 30% by weight based on 100% by weight of an acrylic SMC or BMC. When this content is 1% by weight or more, high thickening effect tends to be obtained, and when 30% by weight or less, the kneading property of an acrylic SMC or ME tends to be excellent. The lower limit of this content is more preferably 2% by weight or more, and particularly preferably 3% by weight or more. The upper limit of this content is more preferably 20% by weight or less, and particularly preferably 15% by weight or less.

As the polymer constituting the polymer powder (C), various polymers can be appropriately selected for use according to requirements, and there is no specific restriction. In view of appearance and the like of the resulting acrylic marble, an acrylic polymer is preferable.

Examples of the constituent components (monomers and the like used for polymerization) include monofunctional monomers such as methyl methacrylate, alkyl (meth)acrylates carrying an alkyl group having 2 to 20 carbons, (meth)acrylates carrying an ester group having a cyclohexane ring such as cyclohexyl (meth)acrylate and the like, (meth)acrylates carrying an ester group having a bicyclo ring such as isobonyl (meth)acrylate and the like, (meth)acrylates carrying an ester group having a tricyclo ring such as tricyclodecanyl (meth)acrylate and the like, (meth)acrylates carrying an ester group having a cyclic ether structure such as glycidyl (meth)acrylate, tetrahydrofurfuryl (meth)acrylate and the like, hydroxyalkyl (meth)acrylates carrying a hydroxyalkyl group having 1 to 20 carbon atoms, (meth)acrylates carrying an ester group having an aromatic ring such as benzyl (meth)acrylate and the like, (meth)acrylates carrying an ester group having a fluorine atom such as 2,2,2-trifluoroethyl (meth)acrylate and the like, (meth)acrylic acid, metal salts of (meth)acrylic acid, fumaric acid, fumarate, maleic acid, maleate, aromatic vinyl, vinyl acetate, (meth)acrylamides, (meth)acrylonitrile, vinyl chloride, maleic anhydride and the like; and polyfunctional monomers such as ethylene glycol di(meth)acrylate, polyethylene glycol di(meth)acrylate, propylene glycol di(meth)acrylate, 1,3-butylene glycol di(meth)acrylate, 1,4-butylene glycol di(meth)acrylate, polybutylene glycol di(meth)acrylate, 1,6-hexanediol di(meth)acrylate, dimethylolethane di(meth)acrylate, 1,1 dimethylolpropane di(meth)acrylate, 2,2dimethylolpropane di(meth)acrylate, trimethylol-thane tri(meth)acrylate, trimethylolpropane tri(meth)acrylate, te-tramethylolmethane tri (meth) acrylate, tetramethylolmethane di(meth)acrylate, neopentyl glycol di(meth)acrylate, polyvalent esters of (meth)acrylic acid with polyhydric alcohol [for example, pentaerythritol, dipentaerythritol and the like], allyl (meth)acrylate and the like. These monofunctional monomers may be polymerized alone to give a homopolymer, or two or more monofunctional monomers may be used together to give a copolymer, or a monofunctional and a polyfunctional monomer may be used together to give a crosslinked polymer. In view of affinity with the component (A), a (meth)acrylic monomer is preferable.

The production method of the polymer powder (C) is not particularly restricted, and can be produced by a known polymerization method. Among them, a method in which an emulsion obtained by emulsion polymerization is subjected to a treatment such as spray drying, freeze drying and the like to obtain a polymer powder is preferable since a polymer powder having a specific bulk density, oil absorption and specific surface area to be used in the present invention can be produced efficiently.

In this case, the above-described method may be an emulsion polymerization method using a surfactant, an emulsion polymerization method using a reactive surfactant, or a soap free emulsion polymerization method using no surfactant.

However, when a polymer powder obtained by emulsion polymerization is used, the hot water resistance of a molded article may sometimes decrease by elution of a surfactant. Therefore, it is preferable to prevent decrease in the hot water resistance of a molded article by using a polymer powder (C1) containing no surfactant produced by a soap free emulsion polymerization method using no surfactant and/or a polymer powder (C2) containing as a constituent component a reactive surfactant produced by an emulsion polymerization method using a reactive surfactant.

Since no surfactant is contained in an acrylic SMC or BMC using the polymer powder (C1) as a thickening agent, elution into aqueous phase of a surfactant which lowers hot water resistance does not occur even when a molded article is exposed to hot water.

Further, in an acrylic SMC or BMC using the polymer powder (C2) as a thickening agent, since a surfactant is bound into a polymer chain of the polymer powder (C2), elution of the surfactant into aqueous phase tends to be suppressed even when a molded article is exposed to hot water.

Herein, the reactive surfactant means a surfactant containing a polymerizable functional group in the molecule. The polymerizable functional group is not particularly restricted, and may be a functional group of polycondensation type, or a functional group of polymerization type. In particular, in view of hot water resistance, a functional group of addition polymerization type is preferable. Examples of the functional group of addition polymerization type include, but not limited to, double bonds such as an allyl group, styryl group, acryloyl group, methacryloyl group, vinyl group, butadienyl group, maleate and the like.

The number of the polymerizable functional group may be advantageously one or more in one molecule of a surfactant. It is preferably from 1 to 5, more preferably from 1 to 2, and particularly preferably 1.

The reactive surfactant is not particularly restricted, and examples thereof include an anionic surfactant, cationic surfactant, nonionic surfactant, ampholytic surfactant and the like, and these can be used alone or in combination of two or more if necessary.

Examples of the reactive surfactant include LATEMUR S-180, S-180A: trade names manufactured by Kao Corp., ADECARIA SOAP SE-5N, SE-10N, SE-20N, NE-10, NE-20, NE-30, NE-40, NE-50, NE-80, NE-100: trade names manufactured by Asahi Denka Kogyo K.K., Antox-MS-60, Antox-MS-2N, Antox-MS-NH4, RA-1020, RA-1120, RA-1820, RF-751, RMA-564, RMA-568, RMA-506, RMA-1120: trade names manufactured by Nippon Nyukazai K.K., and the like.

The amount used of the reactive surfactant is not particularly restricted, and it is preferably in the range from 0.1 to 10 parts by weight based on 100 parts by weight of a monomer to be emilsion-polymerized in view of polymerization stability.

The weight-average molecular weight of the polymer powder (C) is not particularly restricted, and the higher the weight-average molecular weight, the more excellent the hot water resistance of a molded article. The polymer powder (C) is not particularly restricted, and may be a non-crosslinked polymer or a crosslinked polymer.

The polymer powder (C) can be a polymer powder having so-called core/shell structure constituted from core phase and shell phase having different chemical compositions, structures, molecular weights and the like each other. In this case, the core phase may be a non-crosslinked polymer or a crosslinked polymer, while the shell phase is preferably a non-crosslinked polymer.

However, in a method using the polymer powder (C) as a thickening agent, though aging is not necessary, thickening speed is too high, and sometimes kneading is difficult and extrusion is difficult depending on an apparatus used in kneading materials to obtain a BMC or extruding the resulted BMC into certain shape.

Therefore, it is preferable to control thickening speed by using as the polymer powder (C) particularly at least two components selected from a non-crosslinked polymer powder (C3) having a weight-average molecular weight in the range from 100,000 to 2,500,000, a non-crosslinked polymer powder (C4) having a weight-average molecular weight in the range from 2,500,000 to 5,000,000 and a crosslinked polymer powder (C5). The weight-average molecular weight herein referred to means a value calculated in terms of polystyrene according to a GPC method, and specifically means a value measured according to conditions adopted in the following examples.

These polymer powders (C3) to (C5) have different solubilities into the acrylic monomer (A) depending on difference in weight-average molecular weights and presence or absence of crosslinked structure. Therefore, thickening speed can be controlled at will by using these components together.

When the non-crosslinked polymer powder (C3) having a weight-average molecular weight in the range from 100,000 to 2,500,000is used, it tends to be dissolved quickly into the component (A). The lower limit of the weight-average molecular eight is more preferably 300,000 or more, particularly preferably 500,000 or more. The upper limit thereof is more preferably 2,200,000 or less, particularly preferably 2,000,000 or less.

The non-crosslinked polymer powder (C4) having a weight-average molecular weight in the range from 2,500,000 to 5,000,000 tends to be dissolved in the component (A) in lower time than the non-crosslinked polymer powder (C3). The lower limit of the weight-average molecular weight is more preferably 3,000,000 or more. The upper limit is more preferably 4,000,000 or less.

The crosslinked polymer powder (C5) tends to be dissolved in the component (A) in lower time than the non-crosslinked polymer powder (C4) since the powder (C5) is crosslinked.

The combination of the polymer powders (C3) to (C5) is not particularly restricted, and may be appropriately selected according to properties of a kneading apparatus or an extruding apparatus used in producing an acrylic SMC or BMC, and the like. Among them, combination of the non-crosslinked polymer powder (C3) with the non-crosslinked polymer powder (C4), or combination of the non-crosslinked polymer powder (C3) with the crosslinked polymer powder (C5) is preferable.

The compounding ratio between the polymer powders (C3) to (C5) is not particularly restricted, and when two of them are used together, they are used in a ratio preferably in the range from 5/95 to 95/5 (by weight), more preferably in the range from 10/90 to 90/10 (by weight). When three of them are used together, the ratio is not particularly restricted, and it is preferable that each powder is used in an amount of at least 5 parts by weight based on 100 parts by weight of the total amount of the polymer powders (C3) to (C5).

It is also preferable to control thickening speed by compounding the polymer powder (D) having a specific surface area in the range from 0.01 $m^2/g$ to 1 $m^2/g$ together with the polymer powder (C). The polymer powder (D) tends to require longer time to be dissolved in the acrylic monomer (A) than the polymer powder (C) since the powder (D) has an extremely low specific surface area.

The polymer powder (C) to be used together with the polymer powder (D) is not particularly restricted, and may advantageously be selected appropriately according to the properties of an apparatus used in producing an acrylic SMC or BMC, and the like. Especially, as the polymer powder (C) to be used together with the polymer powder (D), at least one selected from the polymer powders (C3) to (C5) is preferable, and the polymer powder (C3) is particularly preferable.

The compounding ratio of the polymer powder (C) to (D) is preferably in the range from 5/95 to 95/5 (by weight), more preferably in the range from 10/90 to 90/10 (by weight). This compounding ratio may advantageously be determined appropriately according to the properties of an apparatus used, and the like.

The bulk density, oil absorption of linseed oil and degree of swelling by methyl methacrylate of the polymer powder (D) are not particularly restricted. The polymer powder (D) may be a crosslinked polymer or a non-crosslinked polymer. The weight-average molecular weight is not particularly restricted.

As the constituent component (monomers used for polymerization) of the polymer powder (C), the above-described acrylic monomers listed for the polymer powder (C) and the like can be used.

The method for producing the polymer powder (D) is not particularly restricted, and known polymerization methods may be used. Among them, a method in which a polymer powder in the form of a bead is obtained by a suspension polymerization method is preferable since this method can produce a polymer powder efficiently having a specific surface area in the range from 0.01 $m^2/g$ to 1 $m^2/g$.

The acrylic SMC or BMC of the present invention can further contain (E) an inorganic filler-containing resin particle, and there can be obtained a granite-like artificial marble having clear grain pattern and excellent design by molding such a compound.

The content of the inorganic filler-containing resin particle (E) is not particularly restricted, and preferably in the range from 1 to 50% by weight based on 100% by weight of the acrylic SMC or BMC. When this content is 1% by weight or more, there is a tendency that grain pattern excellent in design is obtained, and when 50% by weight or less, there is a tendency that kneading property in producing the acrylic SMC or BMC is excellent. The lower limit of this content is more preferably 5% by weight or more, and particularly preferably 10% by weight or more. The upper limit is more preferably 40% by weight or less, and particularly preferably 30% by weight or less.

The resin constituting the inorganic filler-containing resin particle (E) may be any resin providing it is not dissolved in methyl methacrylate, and examples thereof include crosslinked acrylic resins, crosslinked polyester resins, crosslinked styrene resins and the like. The crosslinked acrylic resin is preferable since it has high affinity with an acrylic resin can provide a molded article having beautiful appearance. This crosslinked acrylic resin may contain a non-crosslinked acrylic polymer.

The inorganic filler constituting the inorganic filler-containing resin particle (E) is preferably used in an amount in the range from 20 to 80% by weight based on 100% by weight of the inorganic filler-containing resin particle (E). When this amount used is 20% by weight or more, there is a tendency that the texture and hot water resistance of a molded article are excellent, and when it is 80% by weight or less, there is a tendency that a molded article having high strength is can be obtained.

As the inorganic filler constituting the inorganic filler-containing resin particle (E), that can be appropriately used in organic fillers such as aluminum hydroxide, silica, amorphous silica, calcium carbonate, barium sulfate, titanium oxide, calcium phosphate, talc, clay, grass powder and the like depending on the occasions. In particular, when a granite-like artificial marble is produced, aluminum hydroxide, silica, amorphous silica and glass powder are preferable as the inorganic filler.

The method for producing the inorganic filler-containing resin particle (E) is not particularly restricted, and there is, for example, a method in which a resin molded article containing an inorganic filler obtained by polymerization and curing according to a hot press method, casting method and the like is ground, and classified by a sieve. For example, a method in which acrylic artificial marble is ground and classified is preferable.

As the inorganic filler-containing resin particle (E), those having a particle size smaller than the thickness of a molded article can be used, and only one particle or two or more particles having different colors and particle sizes can be used together.

To the acrylic SMC or BMC of the present invention, there can be added organic peroxides such as benzoyl peroxide, lauroyl peroxide, t-butyl hydroperoxide, cyclohexanone peroxide, methyl ethyl peroxide, t-butyl peroxy octoate, t-butyl peroxy benzoate, t-amyl peroxy benzoate, dicumyl peroxide, 1,1-bis(t-butyl peroxy)3,3,5-trimethylcyclohexane, azobisisobutyronitrile and the like, curing agents such as azo compounds and the like, reinforcing materials such as carbon fiber and the like, various additives such as coloring agents, internal releasing agents, low shrinkage agents, polymerization inhibitors and the like, if necessary.

The acrylic SMC or BMC of the present invention can be produced by kneading a mixture of the above-described component (A), component (B) and component (C), or a mixture prepared by optionally adding the component (D), component (E) and other components to the components (A), (B) and (C). The kneading procedure of these components is not particularly restricted, and all components may be kneaded at one time or a part of the components may be previously mixed before kneading thereof.

As the component (A), an acrylic monomer or acrylic monomer mixture may be used as it is or may be used as an acrylic syrup, as described above. However, use of an acrylic monomer or acrylic monomer mixture as it is preferable since a process for preparing an acrylic syrup can be omitted.

The kneading temperature is not particularly restricted, and preferably in the range from 20 to 70° C. When the kneading temperature is 20° C. or more, there is a tendency that the thickening speed of an acrylic SMC or BMC increases and the productivity of an acrylic SMC or BMC is improved. When the kneading temperature is 70° C. or less, there is a tendency that the storage stability of an acrylic SMC or BMC becomes excellent, and in producing granite-like acrylic SMC or BMC by compounding the inorganic filler-containing resin particle (E), there is a tendency that clearness of grain pattern becomes excellent. The lower limit of the kneading temperature is more preferably 25° C. or more, and particularly preferably 30° C. or more. The upper limit is more preferably 60° C. or less, and particularly preferably 55° or less.

The kneading time is not particularly restricted, and preferably within 20 minutes. When the kneading time is within 20 minutes, there is a tendency that the storage stability of an acrylic SMC or BMC is excellent, and in producing granite-like acrylic SMC or BMC by compounding the inorganic filler-containing resin particle (E), there is a tendency that clearness of grain pattern becomes excellent. The upper limit of the kneading time is more preferably within 15 minutes, particularly preferably within 10 minutes. The lower limit thereof is not particularly restricted, and preferably 10 seconds or more, more preferably 30 seconds or more.

The acrylic SMC or BMC of the present invention exhibits excellent handling property even directly after kneading since the compound is thus thickened in a short period of timer to level wherein no stickiness is recognized. Further, this SMC or B may be subjected to compression molding as it is without aging, and may be subjected to aging before compression molding if necessary.

In the present invention, when kneading is conducted at a kneading temperature and kneading time within the above-described ranges, there is a tendency that the storage stability of the resulted acrylic SMC or BMC is excellent, since then heat history received by an acrylic SMC or BBC in kneading lowers.

Furthermore, when a granite-like artificial marble having grain pattern is obtained by compounding the inorganic filler-containing resin particle (E) into an acrylic SMC or BMC in the present invention, if kneading is conducted at a kneading temperature and kneading time within the above-described ranges, there is a tendency that the swelling and dissolution of the inorganic filler-containing resin particle in the acrylic monomer (A) is suppressed and the grain pattern of the resulted artificial marble becomes clear and the appearance thereof becomes excellent.

In the present invention, a dough-like material thickened by kneading the above-described constituent components may be used as it is, or the above-described constituent components may be kneaded to be thickened to give a dough-like material before being extruded into a desired shape for use, or, further, the above-described constituent components may be mixed uniformly and simultaneously thickened, and extruded into a desired shape, to continuously produce an acrylic SMC or BMC.

In the present invention, it is preferable that two or more thickening agents (polymer powders) are used together as described above, for controlling thickening speed according to the properties of an apparatus used and the like, in the above-described process.

In particular, when the above-described constituent components are kneaded to be thickened to give a dough-like material before being extruded into a desired shape, it is preferable to use as the polymer powder (C) at least tow components selected from the non-crosslinked polymer powder (C3), non-crosslinked polymer powder (C4) and crosslinked polymer powder (C5), or to use the polymer powder (C) together with the polymer powder (D). The combination of the polymer powders (C3) to (C5) and the polymer powder (D) is not particularly restricted, and it is preferable to use at least the non-crosslinked polymer powder (C3).

In the present invention, the method for kneading constituent components is not particularly restricted, and there can be used, for example, a kneader, mixed, roll, extruder, kneading extruder and the like. In particular, when the constituent components are mixed uniformly and simultaneously thickened and extruded into a desired shape, a kneading extruder is suitably used.

The kneading extruder may advantageously be one having kneading function and extruding mechanism inside, and examples there of include, no limited to, those having a screw. It is preferable that this screw has a shape so acting as to decrease heat generation as low as possible in kneading, and it is also possible that passing through of water inside a screw for temperature control is enabled. Regarding temperature control, it is preferable that not only a screw but also a barrel are subjected to temperature control. As the method for the temperature control, known methods may be used. The diameter, length, groove depth, rotation, temperature and the like of a screw may be appropriately selected depending on the amount treated and physical properties of a mixture required. Further, the screw may have one axis, two axes or three axes without any limitation.

Then, one example of the kneading, extruding and continuous shaping production method of the acrylic SMC or BMC of the present invention will be described with referring to drawings.

In an apparatus shown in FIG. 1, liquid components among the constituent components of an acrylic SMC or BMC are thrown into a tank 1. As the liquid components herein used, various combination are possible of the above-described components providing they can pass through a liquid feeding rube (a) 2, liquid feeding pump 3 and a liquid feeding tube (b) 4. For example, combinations of the acrylic monomer (A) with a curing agent, internal releasing agent and the like are listed. When a liquid portion prepared by mixing the components is used, it is preferable that the components are previously weighed and mixed sufficiently before thrown into the tank 1.

For producing the tank 1, liquid feeding tube (a) 2, liquid feeding pump 3 and liquid feeding tube (b) 4, it is preferable to select materials which are not chemically corroded by the liquid components in contact with the materials. The liquid feeding pump 3 may advantageously be a pump having ability to feed liquid in constant amount as represented by, for example, a gear pump and a snake pump, and it is preferable that the pump 3 is selected in view of physical properties of the liquid components such as viscosity and the like.

On the other hand, powdery components among the constituent components of an acrylic SMC or BMC are thrown into a vessel 5. As the powdery components herein used, various combinations of the above-described components are possible providing they can pass through a quantitative feeder 6, and a piping 7. Moreover, depending on the number of the components, the combination of another vessel 5 with the quantitative feeder 6 and the piping 7 may further be added. When a powdery portion prepared by mixing the components is used, it is preferable that the components are previously weighed and mixed sufficiently before being thrown into the vessel 5.

When a powdery portion prepared by mixing components having different particle sizes and specific gravities is thrown into a vessel 5, it is preferable that the vessel 5 has means for enabling mixing such as a stirring blade and the like since there is a possibility of classification in the vessel 5. The vessel 5 is preferably made of a material which is not chemically and physically influenced by the powdery components.

The quantitative feeder 6 is such an apparatus as, for example, a screw feeder, and may advantageously be one having such powder transferring ability. The proportion (by weight) of the feeding amount of the quantitative feeder 6 to the feeding amount of the liquid feeding pump 3 is preferably as constant as possible. Therefore, it is preferable that the amounts thrown in to the hopper 8 of the liquid components and powdery components are controlled with constantly measuring the weights thereof. As the controlling method, there are used for example, a method in which weights of the tank 1 and the vessel 5 are measured, and other known methods.

The piping 7 is a means for throwing the powdery components into the hopper 8. The liquid components and powdery components fed into the hopper 8 is then fed into a kneading and extruding machine 9. The liquid components and powdery components fed are kneaded by the kneading and extruding machine 9 and the kneaded material is simultaneously thickened in the kneading and extruding machine 9 to give a dough-like material.

An extruding die 10 is placed on the leading end of the kneading and extruding machine 9, and controls the shape of the cross section of the continuously extruded dough-like material. The dough-like material thickened in the kneading and extruding machine 9 is formed into a SMC or BMC having a specific shape by being extruded through the die 10. This shaped material is cut into a given length by a cutter 11. The cutter 11 is such means as, for example, a guillotine, but is not limited to a guillotine providing it has the equivalent functions.

Figure 2:
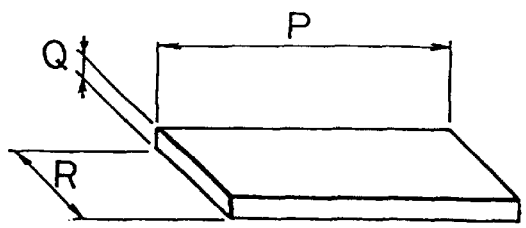
FIG. 2 is a schematic view showing one example of a SMC or BMC which is formed into a sheet shape.

FIG. 2 is a schematic view showing one example of a BMC formed into a sheet shape. In the FIG. 2, P represents length, Q represents thickness and R represents width. P, Q and R may advantageously be controlled into desired dimensions respectively. This BMC shaped material may be transferred into a mold directly after production, to be molded.

Since this BMC shaped material has a draping property, it is preferable that after discharged from the die 10, the shaped material is transferred by a conveyer 12 and the like, as shown in FIG. 1. When longer time is required for transferring before molding, it is preferable that the shape of the BMC shaped material is kept by covering the material with cover films 13 and 14 from upper side and lower side respectively, as shown in FIG. 1. It is preferable that these cover film 13 and 14 have barrier property against monomers and the like contained in the BMC shaped material. Further, when the BMC shape material is transferred, the material is preferably accommodated into a vessel and the like for keeping the shape.

Then, the method for producing acrylic artificial marble of the present invention will be described below.

In the present invention, acrylic artificial marble can be obtained by filling the above-described acrylic SMC or BMC into a mold and curing this with heating and compressing. Specific examples of this heat and compression curing method include, but are not particularly limited to, a compression molding method, injection molding method, extruding molding method and the like.

In this case, the heating temperature is not particularly restricted, and preferably in the range from 80 to 150° C. When the heating temperature is 80° C. or more, curing time can be shortened and productivity tends to increase, and when the heating temperature is 150° C. or less, the appearance of the resulted molded article tends to be excellent. The lower limit of the heating temperature is more preferably 100° C. or more, particularly preferably 110° C. or more. The upper limit is more preferably 140° C. or less, particularly preferably 130° C. or less. Further, within this temperature range, heating may be conducted with making temperature difference between an upper mold and a lower mold.

The compression pressure is not particularly restricted, and preferably in the range from 1 to 20 MPa. When the compression pressure is 1 MPa or more, the filling property of an acrylic SMC or BMC into a mold tends to become excellent, and when it is 20 MPa or less, there is a tendency that excellent appearance of a molded article is obtained. The lower limit of the compression pressure is more preferably 2 MPa or more, and the upper limit is more preferably 15 MPa or less.

The molding time may advantageously be appropriately selected depending on the thickness of a molded article.

The following examples further illustrate the present invention specifically below. All parts and % in the examples are by weight.

Physical Property of Polymer Powder

Average particle size: It was measured using laser scattering particle size distribution analyzer (LA-910, manufactured by HORIBA Ltd.)

Bulk density: It was measured according to JIS R 6126-1970.

Oil absorption: It was measured according to JIS K 5101-1991, and time directly before a putty-like lamp is steeply softened with the last one drop of linseed oil was recognized as terminal point.

Specific surface area: It was measured by a nitrogen adsorption method using a surface area meter SA-6201 (manufactured by HORIBA Ltd.).

Weight average molecular weight: It is a value calculated in terms of polystyrene according to a GPC method, and was measured according to any of the following conditions (1) to (3) depending on the range of the weight-average molecular weight.

(1) In the case of a weight-average molecular weight of 100,000 or less:
  Apparatus: High performance GPC apparatus HLC-8120, manufactured by Tosoh Corp.
  Column: TSKgelG2000HXL and TSKgelG4000HXL are connected in series, manufactured by Tosoh Corp.
  Oven temperature: 40° C.
  Elution solution: Tetrahydrofuran
  Sample concentration: 0.4% by weight
  Flow rate: 1 ml/minute
  Flow amount: 0.1 ml
  Detector: RI (differential refractometer)

(2) In the case of a weight-average molecular weight of 100,000 to 1,000,000:
  Apparatus: High performance GPC apparatus HLC-8020, manufactured by Tosoh Corp.
  Column: Three of TSKgelGMHXL are connected in series, manufactured by Tosoh Corp.
  Oven temperature: 38° C.
  Elution solution: Tetrahydrofuran
  Sample concentration: 0.4% by weight
  Flow rate: 1 ml/minute
  Flow amount: 0.1 ml
  Detector: RI (differential refractometer)

(3) In the case of a weight-average molecular weight of 1,000,000 or more:
  Apparatus: High performance GPC apparatus HLC-8020, manufactured by Tosoh Corp.
  Column: TWO of TSKgelGMHHR-H(30) are connected in series, manufactured by Tosoh Corp.
  Oven temperature: 40° C.
  Elution solution: Tetrahydrofuran
  Sample concentration: 0.4% by weight
  Flow rate: 1 ml/minute
  Flow amount: 0.1 ml
  Detector: RI (differential refractometer)

Since there is not polystyrene standard polymer having a weigh-average molecular weight of over 20,000,000, when a sample having a weigh-average molecular weight of 1,000,000 or more is used, a polystyrene calibration curve was extrapolated to the point of a weigh-average molecular weight of 5,000,000,000.

Degree of swelling: A polymer powder was charged in a 100 ml measuring cylinder, the cylinder was tapped weakly several times to compact the powder to 5 ml, then, to this was charged methyl methacrylate cooled to 10° C. or lower so that the total amount was 100 ml, and the mixture was stirred quickly until the mixture became totally uniform, then, the measuring cylinder was kept in a thermostat at 25° C. for 1 hour, the volume of the polymer powder layer after swelling was measured, and the degree of swelling was represented by ratio to the volume (5 ml) of the polymer powder layer before swelling.

Hot Water Resistance of Molded Article

A molded plate was immersed in hot water of 90° C. for 300 hours, and color changes (whiteness, color difference, degree of yellowing) thereof were compared based on the plate before the immersion.

(1) Production Example of polymer powder (P-1)

Into a reaction apparatus equipped with a cooling tube, thermometer, stirrer, dropping apparatus and nitrogen introducing tube was charged 925 parts of distilled water and 2.25 parts of potassium persulfate as a polymerization initiator, and the resulting mixture was heated at 80° C. with stirring under nitrogen atmosphere. To this was added 250 parts of methyl methacrylate dropwise over 3 hours, then, kept for 2 hours intact for completing soap free emulsion polymerization, to obtain an emulsion containing a polymer primary particle having an average particle size of 0.60 μm.

The resulted emulsion was spray dried using a L-8 type spray drier manufactured by OHKAWARA KAKOHKI Co. Ltd. at inlet temperature/outlet temperature=150° C./90° C., to obtain a non-crosslinked polymer powder (P-1) containing a secondary agglomerate particle having an average particle size of 20 μm and containing no surfactant.

The resulted non-crosslinked polymer powder (P-1) had a weight-average molecular weight of 100,000, and was completely dissolved in methyl methacrylate and had a degree of swelling of 20-fold or more. The physical properties are shown in Table 1.

(2) Production Example of polymer powder (P-2)

Soap free emulsion polymerization was conducted by the same method as for the production example of the polymer powder (P-1) except that the amount of potassium persulfate to be previously charged into the reaction vessel was 1 part, to obtain an emulsion containing a polymer primary particle having an average particle size of 0.60 μm.

The resulted emulsion was spray dried using the same apparatus and the same conditions as for the polymer powder (P-1), to obtain a non-crosslinked polymer powder (P-2) which contains a secondary agglomerate particle having an average particle size of 20 μm and contains no surfactant.

The resulted non-crosslinked polymer powder (P-2) had a weight-average molecular weight of 200,000, and was completely dissolved in methyl methacrylate and had a degree of swelling of 20-fold or more. The physical properties are shown in Table 1.

(3) Production Example of polymer powder (P-3)

Into a reaction apparatus equipped with a cooling tube, thermometer, stirrer, dropping apparatus and nitrogen introducing tube was charged 900 parts of distilled water and 0.6 parts of potassium persulfate as a polymerization initiator, and the resulting mixture was heated at 80° C. with stirring under nitrogen atmosphere. To this was added 20 parts of methyl methacrylate dropwise over 30 minutes, kept for 30 minutes intact, then, the mixture was cooled to 70° C. over 30 minutes, then, to this was added 80 parts of methyl methacrylate dropwise over 2 hours. After completion of the addition, the mixture was kept at 70° C. intact for 1 hour, then, heated again to 80° C. and kept for 1 hour for completing soap free emulsion polymerization, to obtain an emulsion containing a polymer primary particle having an average particle size of 0.60 μm.

The resulted emulsion was spray-dried using the same apparatus and the same conditions as for the polymer powder (P-1), to obtain a non-crosslinked polymer powder (P-3) containing a secondary agglomerate particle having an average particle size of 20 μm and containing no surfactant.

The resulted non-crosslinked polymer powder (P-3) had a weight-average molecular weight of 400,000, and was completely dissolved in methyl methacrylate and had a degree of swelling of 20-fold or more. The physical properties are shown in Table 1.

(4) Production Example of polymer powder (P-3)

Into a reaction apparatus equipped with a cooling tube, thermometer, stirrer, dropping apparatus and nitrogen introducing tube was charged 925 parts of distilled water, 5 parts of polyoxyethylenenonyl phenyl ether (trade name "Emulgen 930", manufactured by Kao Corp.) as a surfactant and 1.5 parts of potassium persulfate as a polymerization initiator, and the resulting mixture was heated at 70° C. with stirring under nitrogen atmosphere. To this was added a mixture composed of 500 parts of methyl methacrylate and 10 parts of a non-reactive surfactant sodium dialkylsulfosuccinate (trade name: "Pelex OT-P", manufactured by Kao Corp.) dropwise over 3 hours, then, kept for 1 hour, and further heated to 80° C. and kept for 1 hour for completing emulsion polymerization, to obtain an emulsion containing a polymer primary particle having an average particle size of 0.10 μm.

The resulted emulsion was spray-dried using the same apparatus and the same conditions as for the polymer powder (P-1), to obtain a non-crosslinked polymer powder (P-4) containing a secondary agglomerate particle having an average particle size of 20 μm.

The resulted non-crosslinked polymer powder (P-4) had a weight-average molecular weight of 400,000, and was completely dissolved in methyl methacrylate and had a degree of swelling of 20-fold or more. The physical properties are shown in Table 1.

(5) Production Example of polymer powder (P-5)

Emulsion polymerization was conducted in the same manner as for the production example of the polymer powder (P-4) except that 5 parts of a reactive surfactant "RMA-568" (manufactured by Nippon Nyukazai K.K.) was used instead of 5 parts of polyoxyethylene nonyl phenyl ether as the surfactant to be previously charged into the reaction vessel, the amount added of potassium sulfate was changed to 0.175 parts, and 10 parts of a reactive surfactant "Antox-MS-60" (manufactured by Nippon Nyukazai K.K.) was used instead of 10 parts of sodium dialkylsulfosuccinate as the surfactant in the mixture to be added dropwise, to obtain an emulsion containing a polymer primary particle having an average particle size of 0.20 μm.

The resulted emulsion was spray dried using the same apparatus and the same conditions as for the polymer powder (P-1), to obtain a non-crosslinked polymer powder (P-5) containing a secondary agglomerate particle having an average particle size of 20 μm and containing as a constituent component a reactive surfactant.

The resulted non-crosslinked polymer powder (P-5) had a weight-average molecular weight of 1,800,000, and was completely dissolved in methyl methacrylate and had a degree of swelling of 20-fold or more. The physical properties are shown in Table 1.

(6) Production Examples of polymer powders (P-6) to (P-9)

Emulsion polymerization was conducted in the same manner as for the production example of the polymer powder (P-5) except that the amount of potassium persulfate to be previously charged into the reaction vessel was 0.375 parts, 0.75 parts, 1.5 parts and 3 parts, to obtain emulsions containing a polymer primary particle having an average particle size of 0.20 μm, 0.20 μm, 0.25 μm and 0.30 μm, respectively.

The resulted emulsions were spray-dried using the same apparatus and the same conditions as for the polymer powder (P-1), to obtain non-crosslinked polymer powders (P-6) to (P-9) containing a secondary agglomerate particle having an average particle size of 20 pm and containing as a constituent component a reactive surfactant.

The resulted non-crosslinked polymer powders (P-6) to (P-9) had a weight-average molecular weight of 900,000, 600,000, 400,000 and 200,000 respectively. The non-crosslinked polymer powders (P-6) to (P-9) were completely dissolved in methyl methacrylate and had a degree of swelling of 20-fold or more. The physical properties are shown in Table 1.

(7) Production Example of polymer powder (P-10)

Emulsion polymerization was conducted in the same manner as for the production example of the polymer powder (P-5) except that the amount of potassium persulfate to be previously charged into the reaction vessel was 1.5 parts, and the mixture to be added dropwise was a mixture composed of 500 parts of methyl methacrylate, 2.5 parts of n-dodecylmercaptane and 10 parts of a reactive surfactant "Antox-MS-60" (manufactured by Nippon Nyukazai K.K.), to obtain an emulsion containing a polymer primary particle having an average particle size of 0.30 /μm.

The resulted emulsion was spray-dried using the same apparatus and the same conditions as for the polymer powder (P-1), to obtain a non-crosslinked polymer powder (P-10) containing a secondary agglomerate particle having an average particle size of 20 μm and containing as a constituent component a reactive surfactant.

The resulted non-crosslinked polymer powder (P-10 had a weight-average molecular weight of 100,000, and was completely dissolved in methyl methacrylate and had a degree of swelling of 20-fold or more. The physical properties are shown in Table 1.

(8) Production Examples of polymer powders (P-11) to (P-14)

Emulsion polymerization was conducted in the same manner as for the production example of the polymer powder (P-4) except that 5 parts of sodium alkyldiphenyl ether disulfonate (trade name: "Pelex SS-H", manufactured by Kao Corp.) was used instead of 5 parts of polyoxyethylenenonyl phenyl ether as the non-reactive surfactant to be previously charged into the reaction vessel, the amount of sodium dialkylsulfosuccinate in the mixture to be added dropwise was changed to 5 parts, and the amount of the polymerization initiator potassium persulfate was changed to 1 part, 0.25 parts, 0.1 part and 0.05 parts, to obtain emulsions containing a polymer primary particle having an average particle size of 0.08 μm, 0.10 μm, 0.16 μm, 0.18 μm.

The resulted emulsions were spray-dried using the same apparatus and the same conditions as for the polymer powder (P-1), to obtain non-crosslinked polymer powders (P-11) to (P-14) containing a secondary agglomerate particle having an average particle size of 30 μm, 20 μm, 20 μμm, 20 μm respectively.

The resulted non-crosslinked polymer powders (P-11) to (P-14) had a weight-average molecular weight of 600,000, 1,400,000, 3,300,000 and 3,800,000 respectively. The non-crosslinked polymer powders (P-11) to (P-14) were completely dissolved in methyl methacrylate and had a degree of swelling of 20-fold or more. The physical properties are shown in Table 1.

(9) Production Example of polymer powder (P-15)

Emulsion polymerization was conducted in the same manner as for the production example of the polymer powder (P-4) except that 5 parts of sodium alkyldiphenyl ether disulfonate was used instead of 5 parts of polyoxyethylenenonyl phenyl ether as the non-reactive surfactant to be previously charged into the reaction vessel, the amount added of potassium sulfate was changed to 0.25 parts, and the mixture to be added drop-wise was changed to a mixture composed of 497.5 parts of methyl methacrylate, 2.5 parts of 1,3-butylene glycol dimethacrylate and 5 parts of sodium dialkylsulfosuccinate, to obtain an emulsion containing a polymer primary particle having an average particle size of 0.18 μm.

The resulted emulsion was spray-dried using the same apparatus and the same conditions as for the polymer powder (P-1), to obtain a non-crosslinked polymer powder (P-15) containing a secondary agglomerate particle having an average particle size of 18 μm.

The resulted crosslinked polymer powder (P-15) had a degree of swelling by methyl methacrylate of 20-fold or more. The physical properties are shown in Table 1.

(10) Production Example of polymer powder (P-16)

Emulsion polymerization was conducted in the same manner as for the production example of the polymer powder (P-4) except that 5 parts of sodium alkyldiphenyl ether disulfonate was used instead of 5 parts of polyoxyethylenenonyl phenyl ether as the non-reactive surfactant to be previously charged into the reaction vessel, the amount added of potassium sulfate was changed to 0.5 parts, and the mixture to be added drop-wise was changed to a mixture composed of 480 parts of methyl methacrylate, 20 parts of ethyl acrylate and 5 parts of sodium dialkylsulfosuccinate, to obtain an emulsion containing a polymer primary particle having an average particle size of 0.20 μm.

The resulted emulsion was spray-dried using the same apparatus as for the polymer powder (P-1) at conditions of inlet temperature/outlet temperature=150° C./60° C., to obtain a non-crosslinked polymer powder (P-16) containing a secondary agglomerate particle having an average particle size of 20 μm.

The resulted non-crosslinked polymer powder (P-16) had a weight-average molecular weight of 700,000, was dissolved completely in methyl methacrylate, and had a degree of swelling of 20-fold or more. The physical properties are shown in Table 1.

(11) Production Example of polymer powder (P-17)

Emulsion polymerization was conducted in the same manner as for the production example of the polymer powder (P-4) except that 5 parts of "Emulgen 910" instead of 5 parts of "Emulgen 930" as the polyoxyethylenenonyl phenyl ether to be charged into the reaction vessel, the amount added of potassium sulfate was changed to 1.75 parts, and 7.5 parts of polyoxyethylenenonyl phenyl ether (trade name: "Emulgen 905", manufactured by Kao Corp.) and 5 parts of sodium dialkylsulfosuccinate were used as the non-reactive surfactant in the monomer to be added dropwise, to obtain an emulsion containing a polymer primary particle having an average particle size of 0.60 μm.

The resulted emulsion was spray dried using the same apparatus and the same conditions as for the polymer powder (P-1), to obtain a non-crosslinked polymer powder (P-17) containing a secondary agglomerate particle having an average particle size of 20 μm.

The resulted non-crosslinked polymer powder (P-17) had a weight-average molecular weight of 300,000, was dissolved completely in methyl methacrylate, and had a degree of swelling of 20-fold or more. The physical properties are shown in Table 1.

(12) Production Example of polymer powder (P-18)

Emulsion polymerization was conducted in the same manner as for the production example of the polymer powder (P-4) except that 12.5 parts of "Emulgen 910" instead of 5 parts of "Emulgen 930" as the polyoxyethylenenonyl phenyl ether to be charged into the reaction vessel, the amount added of potassium sulfate was changed to 3 parts, and the mixture to be added dropwise was changed to a mixture composed of 450 parts of methyl methacrylate, 50 parts of styrene and 5 parts of sodium dialkylsulfosuccinate, to obtain an emulsion containing a polymer primary particle having an average particle size of 0.20 μm.

The resulted emulsion was spray-dried using the same apparatus as for the polymer powder (P-1) at conditions of inlet temperature/outlet temperature=150° C./60° C., to obtain a non-crosslinked polymer powder (P-18) containing a secondary agglomerate particle having an average particle size of 30 λm.

The resulted non-crosslinked polymer powder (P-18) had a weight-average molecular weight of 200,000, was dissolved completely in methyl methacrylate, and had a degree of swelling of 20-fold or more. The physical properties are shown in Table 1.

(13) Production Example of polymer powder (P-19)

Into a reaction apparatus equipped with a cooling tube, thermometer, stirrer, dropping apparatus and nitrogen introducing tube was charged 750 parts of distilled water, 4 parts of sodium alkyldiphenyl ether disulfonate and 2.25 parts of potassium persulfate, and the resulting mixture was heated at 80° C. with stirring under nitrogen atmosphere. To this was added a mixture composed of 485 parts of methyl methacrylate, 15 parts of methyl acrylate and 5 parts of sodium dialkylsulfosuccinate dropwise over 3 hours, then, kept for 2 hours for completing emulsion polymerization, to obtain an emulsion containing a polymer primary particle having an average particle size of 0.10 μm.

The resulted emulsion was spray-dried using No. 62TF type spray drier manufactured by APV ANHYDRO CO., LTD. at inlet tepperature/outlet temperature=150° C./60° C., to obtain a non-crosslinked polymer powder (P-19) (19) containing a secondary agglomerate particle having an average particle size of 100 μm.

The resulted non-crosslinked polymer powder (P-19) had a weight-average molecular weight of 100,000, and was completely dissolved in methyl methacrylate and had a degree of swelling of 20-fold or more. The physical properties are shown in Table 1.

(14) Production Example of polymer powder (P-20)

Into a reaction apparatus equipped with a cooling tube, thermometer, stirrer, dropping apparatus and nitrogen introducing tube was charged 925 parts of distilled water, 5 parts of sodium alkyldiphenyl ether disulfonate and 0.25 parts of potassium persulfate, and the resulting mixture was heated at 70° C. with stirring under nitrogen atmosphere. To this was added a mixture composed of 149.85 parts of methyl methacrylate, 0.15 parts of 1,3-butylene glycol dimethacrylate and 5 parts of sodium dialkylsulfosuccinate dropwise over 5 hours, then, kept for 1 hour, subsequently to this was added 350 parts of methyl methacrylate dropwise over 3.5 hours, then kept for 1 hour, then, kept for 1 hour for completing emulsion polymerization, to obtain an emulsion having a core shell structure containing a polymer primary particle having an average particle size of 0.10 μm.

The resulted emulsion was spray-dried using the same spray drier and same conditions as for the polymer powder (P-1), to obtain a polymer powder (P-20) containing a secondary agglomerate particle having an average particle size of 20 μm and having core/shell structure in which the core phase is composed of a crosslinked polymer and the shell phase is composed of a non-crosslinked polymer. The resulted polymer powder having core-shell structure had a degree of swelling of 20-fold or more. The physical properties are shown in Table 1.

(15) Production Example of polymer powder (P-21)

Into a reaction apparatus equipped with a cooling tube, thermometer, stirrer, dropping apparatus and nitrogen introducing tube was charged 800 parts of distilled water and 1 part of polyvinyl alcohol (degree of saponification: 88%, degree of polymerization: 1000) to prepare a solution, then, to this was added a monomer solution prepared by dissolving 2 parts of n-dodecylmercaptane and 2 parts of azobisisobutyronitrile into 400 parts of methyl methacrylate, and the mixture was heated up to 80° C. over 1 hour with stirring at 300 rpm under nitrogen atmosphere, and heated under same conditions for 2 hours. Then, the mixture was heated up to 90° C. and heated for 2 hours, then, cooled to room temperature for completion of the suspension polymerization. The resulted suspension was filtered and washed, then, dried by a hot air dryer at 50° C., to obtain a non-crosslinked polymer powder (P-21) having an average particle size of 350 μm. The resulted non-crosslinked polymer powder (P-21) had a weight-average molecular weight of 40,000 and a degree of swelling by methyl methacrylate was 1.2. The physical properties are shown in Table 1.

(16) Production Example of polymer powder (P-22)

Suspension polymerization was conducted in the same manner as for the production example of the polymer powder (P-21) except that the stirring rotation was 500 rpm, to obtain a non-crosslinked polymer powder (P-22) having an average particle size of 30 μm.

(17) Production Example of polymer powder (P-23)

Suspension polymerization was conducted in the same manner as for the production example of the polymer powder (P-21) except that the monomer solution to be charged was a monomer solution prepared by dissolving 2 parts of azobisisobutyronitrile into a mixture composed of 359.6 parts of methyl methacrylate, 40 parts of ethyl acrylate and 0.4 parts of ethylene glycol dimethacrylate, and the stirring rotation was 500 rpm, to obtain a crosslinked polymer powder (P-23) having an average particle size of 30 μm. The physical properties are shown in Table 1.

(18) Production Example of polymer powder (P-24)

Suspension polymerization was conducted in the same manner as for the production example of the polymer powder (P-21) except that the monomer solution to be charged was a monomer solution prepared by dissolving 0.5 parts of azobisisobutyronitrile into 400 parts of methyl methacrylate, and the stirring rotation was 500 rpm, to obtain a non-crosslinked polymer powder (P-24) having an average particle size of 30 μm and a weigh-average molecular weight of 1,200,000. The physical properties are shown in Table 1.

(19) Production Example of polymer powder (P-25)

Suspension polymerization was conducted in the same manner as for the production example of the polymer powder (P-21) except that the monomer solution to be charged was a monomer solution prepared by dissolving 1.2 parts n-dodecylmercaptane and 0,5 parts azobisisobutyronitrile into a mixture composed of 384 parts of methyl methacrylate and 16 parts of methyl acrylate, and the stirring rotation was 500 rpm, to obtain a non-crosslinked polymer powder (P-25) having an average particle size of 30 μm and a weigh-average molecular weight of 120,000. The physical properties are shown in Table 1.

(20) Production Example of polymer powder (P-26)

Suspension polymerization was conducted in the same manner as for the production example of the polymer powder (P-21) except that the monomer solution to be charged was a monomer solution prepared by dissolving 0.3 parts n-dodecylmercaptane and 2 parts azobisisobutyronitrile into a mixture composed of 340 parts of methyl methacrylate, 12 parts of ethyl acrylate and 48 parts of methacrylic acid, and the initial heating was effected up to 75° C., to obtain a non-crosslinked polymer powder (P-26) having an average particle size of 350 μm and a weigh-average molecular weight of 280,000. The physical properties are shown in Table 1.

(21) Production Example of polymer powder (P-27)

Suspension polymerization was conducted in the same manner as for the production example of the polymer powder (P-21) except that the monomer solution to be charged was a monomer solution prepared by dissolving 0.6 parts n-dodecylmercaptane and 4 parts azobisisobutyronitrile into a mixture composed of 280 parts of methyl methacrylate and 120 parts of styrene, and the initial heating was effected up to 75° C., to obtain a non-crosslinked polymer powder (P-27) having an average particle size of 350 µm and a weigh-average molecular weight of 200,000. The physical properties are shown in Table 1.

(22) Production Example of polymer powder (P-28)

Suspension polymerization was conducted in the same manner as for the production example of the polymer powder (P-21) except that the monomer solution to be charged was a monomer solution prepared by dissolving 1.2 parts n-dodecylmercaptane and 0.8 parts azobisisobutyronitrile into a mixture composed of 360 parts of methyl methacrylate and 40 parts of methyl acrylate, and the initial heating was effected up to 75° C., to obtain a non-crosslinked polymer powder (P-28) having an average particle size of 350 µm and a weigh-average molecular weight of 100,000. The physical properties are shown in Table 1.

(23) Production example of syrup (A-1)

8 parts of the non-crosslinked polymer powder (P-21) was added to a monomer mixture composed of 10 parts of methyl methacrylate and 9 pats of 1,3-butylene glycol dimethacrylate, and the mixture was heated up to 5° C. and stirred for 2 hours to dissolve the non-crosslinked polymer powder (P-21) completely, to obtain a syrup (A-1).

(24) Production example of syrup (A-2)

11 parts of the non-crosslinked polymer powder (P-21) was added to a monomer mixture composed of 14 parts of methyl methacrylate and 6 pats of neopentyl glycol dimethacrylate, and the mixture was heated up to 50° C. and stirred for 2 hours to dissolve the non-crosslinked polymer powder (P-21) completely, to obtain a syrup (A-2).

(25) Production example of syrup (A-3)

A syrup (A-3) was obtained in the sane manner as for the production example of the syrup (A-1) except that the amount of the non-crosslinked polymer powder (P-21) was 7 parts, the amount of methyl methacrylate was 8 parts and the amount of 1,3-butylene glycol dimethacrylate was 7 parts.

(26) Production example of syrup (A-4)

A syrup (A-4) was obtained in the same manner as for the syrup (A-2) except that the non-crosslinked polymer powder (P-22) was used instead of the non-crosslinked polymer powder (P-21), and the amount of neopentyl glycol dimethacrylate was 5 parts.

(27) Production example of syrup (A-5)

A syrup (A-5) was obtained in the same manner as for the syrup (A-1) except that 10 parts of the non-crosslinked polymer powder (P-22) was used instead of 8 parts of the non-crosslinked polymer powder (P-21), and the amount of 1,3-butylene glycol dimethacrylate was 4 parts. (28) Production example of inorganic filler-containing resin particle To 30 parts of the syrup (A-1) was added 0.5 parts of t-amyl peroxy benzoate (trade name: K-1, manufactured by Kayaku Akuzo K.K.), 0.15 parts of zinc stearate as an internal releasing agent, 60 parts of aluminum hydroxide (trade name: Higilite H-310, manufactured by Showa Denko K.K.) as an inorganic filler, 0.05 parts of a white inorganic pigment or black inorganic pigment and 10 parts of the non-crosslinked polymer powder (P-11), and the mixture was kneaded for 10 minutes by a kneader to obtain an acrylic SMC. Then, this acrylic BMC was filled in a mold for flat plate molding of 200 mm square and was cured with heating and compressing for 10 minutes under conditions of a mold temperature of 130° C. and a pressure of 10 MPa, to obtain white or black acrylic artificial marble having a thickness of 10 mm. The resulted acrylic artificial marble was ground by a crusher to obtain a white or black inorganic filler-containing resin particle having an average particle size of 350 µm. The powdery properties thereof are shown in Table 2.

TABLE 1

| | | | powdery property of polymer powder | | | | | | |
|---|---|---|---|---|---|---|---|---|---|
| polymer powder | composition of polymer powder | surfactant | average particle size of primary particle (µm) | average particle size of secondary particle (µm) | bulk density (g/ml) | oil absorption (ml/100 g) | degree of swelling (-fold) | specific surface area (m²/g) | weight-average molecular weight |
| P-1 | MMA = 100 | — | 0.60 | 20 | 0.40 | 100 | 20-fold or more | 9 | 100,000 |
| P-2 | MMA = 100 | — | 0.60 | 20 | 0.40 | 100 | 20-fold or more | 9 | 200,000 |
| P-3 | MMA = 100 | — | 0.60 | 20 | 0.40 | 100 | 20-fold or more | 9 | 400,000 |
| P-4 | MMA = 100 | Pelex OT-P Emulgen 930 | 0.10 | 20 | 0.38 | 100 | 20-fold or more | 50 | 400,000 |
| P-5 | MMA = 100 | Antox-MS-60 RMA-568 | 0.20 | 20 | 0.40 | 100 | 20-fold or more | 24 | 1,800,000 |
| P-6 | MMA = 100 | Antox-MS-60 RMA-568 | 0.20 | 20 | 0.40 | 100 | 20-fold or more | 24 | 900,000 |
| P-7 | MMA = 100 | Antox-MS-60 RMA-568 | 0.20 | 20 | 0.40 | 100 | 20-fold or more | 24 | 600,000 |
| P-8 | MMA = 100 | Antox-MS-60 RMA-568 | 0.25 | 20 | 0.40 | 100 | 20-fold or more | 14 | 400,000 |
| P-9 | MMA = 100 | Antox-MS-60 RMA-568 | 0.30 | 20 | 0.40 | 100 | 20-fold or more | 10 | 200,000 |
| P-10 | MMA = 100 | Antox-MS-60 RMA-568 | 0.30 | 20 | 0.40 | 100 | 20-fold or more | 10 | 100,000 |
| P-11 | MMA = 100 | Pelex OT-P Pelex SS-H | 0.08 | 30 | 0.40 | 100 | 20-fold or more | 51 | 600,000 |
| P-12 | MMA = 100 | Pelex OT-P | 0.10 | 20 | 0.38 | 100 | 20-fold or more | 50 | 1,400,000 |

TABLE 1-continued

| | | | powdery property of polymer powder | | | | | | |
|---|---|---|---|---|---|---|---|---|---|
| polymer powder | composition of polymer powder | surfactant | average particle size of primary particle ($\mu$m) | average particle size of secondary particle ($\mu$m) | bulk density (g/ml) | oil absorption (ml/100 g) | degree of swelling (-fold) | specific surface area (m$^2$/g) | weight-average molecular weight |
| P-13 | MMA = 100 | Pelex SS-H Pelex OT-P | 0.16 | 20 | 0.38 | 100 | 20-fold or more | 28 | 3,300,000 |
| P-14 | MMA = 100 | Pelex SS-H Pelex OT-P | 0.18 | 20 | 0.38 | 100 | 20-fold or more | 24 | 3,800,000 |
| P-15 | MMA/BDMA = 99.5/0.5 | Pelex SS-H Pelex OT-P | 0.18 | 18 | 0.38 | 95 | 20-fold or more | 24 | — |
| P-16 | MMA/EA = 96/4 | Pelex SS-H Pelex OT-P | 0.20 | 20 | 0.38 | 100 | 20-fold or more | 26 | 700,000 |
| P-17 | MMA = 100 | Pelex SS-H Pelex OT-P Emulgen 905 Emulgen 910 | 0.60 | 20 | 0.38 | 100 | 20-fold or more | 9 | 300,000 |
| P-18 | MMA/ST = 90/10 | Pelex OT-P Emulgen 910 | 0.20 | 30 | 0.38 | 100 | 20-fold or more | 23 | 200,000 |
| P-19 | MMA/MA = 97/3 | Pelex OT-P Pelex SS-H | 0.10 | 100 | 0.60 | 80 | 20-fold or more | 42 | 100,000 |
| P-20 | core phase: MMA/BDMA = 99.9/0.1 shell phase: MMA = 100 | Pelex OT-P Pelex SS-H | 0.10 | 20 | 0.38 | 100 | 20-fold or more | 51 | shell phase 1,400,000 |
| P-21 | MMA = 100 | — | | 350 | 0.73 | 45 | 1.2 | 0.07 | 40,000 |
| P-22 | MMA = 100 | — | | 30 | 0.57 | 50 | 1.2 | 0.2 | 40,000 |
| P-23 | MMA/EA/EDMA = 89.9/10/0.1 | — | | 30 | 0.57 | 50 | 3.1 | 0.2 | — |
| P-24 | MMA = 100 | — | | 30 | 0.57 | 50 | 1.2 | 0.2 | 1,200,000 |
| P-25 | MMA/MA = 96/4 | — | | 30 | 0.57 | 50 | 1.2 | 0.2 | 1,200,000 |
| P-26 | MMA/EA/MAA = 85/3/12 | — | | 350 | 0.73 | 50 | 1.2 | 0.07 | 280,000 |
| P-27 | MMA/ST = 70/30 | — | | 350 | 0.73 | 50 | 1.2 | 0.07 | 200,000 |
| P-28 | MMA/MA = 90/10 | — | | 350 | 0.73 | 50 | 1.2 | 0.07 | 100,000 |

MMA: methyl methacrylate MA: methyl acrylate EA: ethyl acrylate ST: styrene MAA: methacrylic acid EDMA: ethylene glycol dimethacrylate BDMA: 1,3-butylene glycol dimethacrylate Antox-MS-60: reactive surfactant RMA-568: reactive surfactant Pelex OT-P: non-reactive surfactant Pelex SS-H: non-reactive surfactant Emulgen 905, 910, 930: non-reactive surfactant

TABLE 2

| | powdery property of inorganic filler-containing resin particle | | | |
|---|---|---|---|---|
| average particle size ($\mu$m) | bulk density (g/ml) | oil absorption (ml/100 g) | degree of swelling (-fold) | specific surface area (m$^2$/g) |
| inorganic filler-containing resin particle 350 | 0.82 | 45 | 1.1 | 0.5 |

EXAMPLE 1

A mixture of 7 parts of methyl methacrylate, 3 parts of isobonyl methacrylate and 10 parts of neopentyl glycol dimethacrylate as an acrylic monomer mixture (A), 0.5 parts of t-amyl peroxy benzoate (trade name: KD-1, manufactured by Kayaku Akuzo K.K) as a curing agent, 0.15 parts of zinc stearate as an internal releasing agent, 65 parts of aluminum hydroxide (trade name: Higilite H-310, manufactured by Showa Denko K.K.) as an inorganic filler (B), 0.36 parts of a green inorganic pigment, 0.06 parts of a blue inorganic pigment and 0.07 parts of a black inorganic pigment as coloring agents, and 15 parts of the polymer powder (P-1) as a thickening agent were charged into a kneader, and kneaded for 10 minutes to obtain an acrylic BMC. The resulted acrylic BMC was thickened to become a dough-like material even directly after the kneading, had no stickiness and gave excellent handing property.

Then, 700 g of this acrylic BMC was filled in a mold for flat plate molding of 200 mm square and was cured with heating and compressing for 10 minutes under conditions of a mold temperature of 130° C. and a pressure of 10 Mpa, to obtain dark green acrylic artificial marble having a thickness 10 mm. The surface of the resulted artificial marble had extremely high gloss, and was a mirror-like surface having no defect, and appearance thereof was extremely good.

Further, color change of the molded article after immersion in hot water was fairly small, and excellent hot water resistance was shown.

EXAMPLE 2

An acrylic BMC was obtained in the same manner as for Example 1 except that the polymer powder (P-2) was used as the thickening agent, and the amount added of the acrylic monomer mixture, the amount added of aluminum hydroxide and amount added of the curing agent were changed as shown in Table 3. The resulted acrylic BMC was thickened to become a dough-like material even directly after the kneading, had no stickiness and gave excellent handling property.

Then, a dark green acrylic artificial marble was obtained in the same manner as for Example 1 using this acrylic BMC. The evaluation results are shown in Table 3.

EXAMPLE 3

An acrylic BMC was obtained in the same manner as for Example 1 except that 27 parts of the syrup (A1) was used as the acrylic monomer mixture (A), 10 parts of the polymer powder (P-3) was used as the thickening agent, and the amount added of aluminum hydroxide was changed to 63 parts. The resulted acrylic BMC was thickened to become a dough-like material even directly after the kneading, had no stickiness and gave excellent handling property.

Then, a dark green acrylic artificial marble was obtained in the same manner as for Example 1 using this acrylic BMC. The evaluation results are shown in Table 3.

EXAMPLE 4

A mixture of 7 parts of methyl methacrylate, 4 parts of isobonyl methacrylate and 13 parts of neopentyl glycol dimethacrylate as an acrylic monomer mixture (A), 0.65 parts of t-amyl peroxy benzoate as a curing agent, 0.15 parts of zinc stearate as an internal releasing agent, 46 parts of aluminum hydroxide as an inorganic filler (B), 20 parts of an inorganic filler-containing resin particle (E) (10 parts of a white inorganic filler-containing resin particle and 10 part of a black inorganic filler-containing resin particle), and 10 parts of the polymer powder (P-1) as a thickening agent were charged into a kneader, and kneaded for 10 minutes to obtain an acrylic BMC. The resulted acrylic BMC was thickened to become a dough-like material even directly after the kneading, had no stickiness and gave excellent handling property.

Then, black granite-like acrylic artificial marble of 200 mm square and 10 mm thickness was obtained in the same manner as for Example 1 using this acrylic BMC. The surface of the resulted artificial marble had extremely high gloss, was a mirror-like surface having no defect and had clear grain pattern without unevenness, and appearance thereof was extremely good.

Further, color change of the molded article after immersion in hot water was fairly small, and excellent hot water resistance was shown.

EXAMPLES 5 to 6

Acrylic BMC was obtained in the same manner as for Example 4 except that 27 parts of the syrup (A1) was used as the acrylic monomer mixture (A) and other composition was changed as shown in Table 3. The resulted acrylic BMC was thickened to become dough-like materials even directly after the kneading, had no stickiness and gave excellent handling property.

Then, black granite-like acrylic artificial marble was obtained in the same manner as for Example 1 using this acrylic BMC. The evaluation results are shown in Table 3.

EXAMPLE 7

An acrylic BMC was obtained in the same manner as for Example 3 except that the polymer powder (P-4) was used as the thickening agent. The resulted acrylic BMC was thickened to become a dough-like material even directly after the kneading, had no stickiness and gave excellent handling property.

Then, dark green acrylic artificial marble was obtained in the same manner as for Example 1 using this acrylic BMC:. The evaluation results are shown in Table 3.

EXAMPLE 8

An acrylic BMC was obtained in the same manner as for Example 6 except that the polymer powder (P-4) was used as the thickening agent. The resulted acrylic BMC was thickened to become a dough-like material even directly after the kneading, had no stickiness and gave excellent handling property.

Then, black granite-like acrylic artificial marble was obtained in the same manner as for Example 1 using this acrylic BMC. The evaluation results are shown in Table 3.

Comparative Example 1

An acrylic BMC was obtained in the same manner as for Example 4 except that the polymer powder (P-21) was used as the thickening agent.

The resulted acrylic BMC was not thickened directly after the kneading and in the form of semi-liquid, and had stickiness and exhibited extremely poor handling property. It was necessary to age this BMC at 60° C. for 24 hours or more for keeping this acrylic BMC under non-sticky condition.

Black granite-like acrylic artificial marble was obtained in the same manner as for Example 1 using the acrylic BMC obtained by aging as described above, and the surface of the molded article had a pinhole and had uneven grain pattern, and this grain pattern was indefinite and appearance thereof was extremely poor. The evaluation results are shown in Table 3.

EXAMPLES 9 to 12

Acrylic BMC was obtained in the same manner as for Example 1 except that composition of the acrylic BMC was changed as shown in Table 4. The resulted acrylic BMC was thickened to become a dough-like material even directly after the kneading, had no stickiness and gave excellent handling property.

Then, dark green acrylic artificial marble was obtained in the same manner as for Example 1 using this acrylic BMC. The evaluation results are shown in Table 4.

EXAMPLES 13 to 16

Acrylic BMC was obtained in the same manner as for Example 4 except that composition of the acrylic BMC was changed as shown in Table 4. The resulted acrylic BMC was thickened to become a dough-like material even directly after the kneading, had no stickiness and gave excellent handling property.

Then, black granite-like acrylic artificial marble was obtained in the same manner as for Example 1 using this acrylic BMC. The evaluation results are shown in Table 4.

EXAMPLES 17

An acrylic BMC was obtained in the same manner as for Example 4 except that the composition of the acrylic BMC was changed as shown in Table 4 (kneading temperature: 25° C.). The resulted acrylic BMC was thickened to become a dough-like material even directly after the kneading, had no stickiness and gave excellent handling property. Further, even when left for 3 months in atmosphere at 23° C., it was not cured and extremely excellent storage stability was shown.

Then, black granite-like acrylic artificial marble was obtained in the same manner as for Example 1 using this acrylic BMC. The evaluation results are shown in Table 4.

EXAMPLE 18

A mixture of 15 parts of methyl methacrylate and 13 parts of neopentyl glycol dimethacrylate as an acrylic monomer mixture (A), 0.8 parts of 1,1-bis(t-butyl peroxy)3,3,5-trimethylcyclohexane (trade name: Perhexa, manufactured by NOF Corp.) as a curing agent, 0.15 parts of zinc stearate as an internal releasing agent, 61 parts of aluminum hydroxide as an inorganic filler (B), and 8 pats of the polymer powder (P-11) and 3 parts of the polymer powder (P-13) as curing agents were charged into a kneader, and kneaded for 10 minutes to obtain an acrylic BMC. The resulted acrylic BMC was thickened to suitable viscosity to become a dough-like material even directly after the kneading, had no stickiness and gave excellent handling property.

Then, this acrylic BMC was extruded by a 6-inch single screw extruder (L/D=13.2) at a speed of 200 kg/h into a sheet having a width of 150 mm and a thickness of 10 m. The temperature of the extruded BMC was 50° C. or less and extrusion was conducted without problem.

This sheet shaped acrylic BMC was aged at room temperature for 1 hour to complete thickening. The acrylic BMC after the thickening kept the sheet shape before the aging intact.

When this sheet shaped acrylic BMC was left in atmosphere at 23° C., it was not cured even after 3 months or more and extremely excellent storage stability was shown.

This sheet shaped acrylic BMC was cut and filled in an amount of 700 g into a flat plate mold of 200 mm square, and acrylic artificial marble of 200 mm square and 10 mm thickness was obtained in the same manner as in Example 1. The surface of the resulted artificial marble had extremely high gloss, was a mirror-like surface having no defect, and appearance thereof was extremely good. The evaluation results are shown in Table 5.

EXAMPLE 19

A mixture of 7 parts of methyl methacrylate and 13 parts of 1,3-butylene glycol dimethacrylate as an acrylic monomer mixture (A), 0.8 parts of 1,1-bis(t-butyl peroxy)3,3,5-trimethylcyclohexane as a curing agent, 0.15 parts of zinc stearate as an internal releasing agent, 51 parts of aluminum hydroxide as an inorganic filler (B), 20 parts of an inorganic filler-containing resin particle (E) (10 parts of a white inorganic filler-containing resin particle and 10 parts of a black inorganic filler-containing resin particle), and 6 pats of the polymer powder (P-11) and 3 parts of the polymer powder (P-13) as curing agents were charged into a kneader, and kneaded for 10 minutes to obtain an acrylic BMC. The resulted acrylic BMC was thickened to suitable viscosity to become a dough-like material even directly after the kneading, had no stickiness and provided excellent handling property.

Then, this acrylic B was extruded into sheet shape in the same manner as in Example 18. The temperature of the extruded BMC was 50° C. or less and extrusion was conducted without problem.

This sheet shaped acrylic BMC was aged at room temperature for 1 hour to complete thickening. The acrylic BMC after the thickening for 1 hour kept the sheet shape before the aging intact.

When this sheet shaped acrylic BMC was left in atmosphere at 23° C., it was not cured even after 3 months or more and extremely excellent storage stability was shown.

This sheet shaped acrylic BMC was cut and filled in an amount of 700 g into a flat plate mold of 200 mm square, and acrylic artificial marble of 200 mm square and 10 mm thickness was obtained in the same manner as in Example 1. The surface of the resulted artificial marble had extremely high gloss, was a mirror-like surface having no defect had clear grain pattern without unevenness, and appearance thereof was extremely good. The evaluation results are shown in Table 5.

EXAMPLES 20 to 22

Acrylic BMC was obtained in the same manner as in Example 18 except that the syrup (A2) was used as the acrylic monomer mixture (A) and the thickening agent was changed as shown in Table 5, and the acrylic BMC was extruded into sheet shape, aged, then, cured with heating and compressing, to obtain acrylic artificial marble. The evaluation results are shown in Table 5.

EXAMPLES 23

Acrylic BMC was obtained in the same manner as in Example 19 except that the syrup (A3) was used as the acrylic monomer mixture (A) and the thickening agent was changed as shown in Table 5, and the acrylic BMC was extruded into sheet shape, aged, then, cured with heating and compressing, to obtain granite-like acrylic artificial marble. The evaluation results are shown in Table 5.

EXAMPLES 24

Acrylic B was obtained in the same manner as in Example 18 except that the polymer powder (P-11) was used alone as the thickening agent as shown in Table 5 (kneading temperature: 25° C.). The resulted acrylic BMC was thickened to become a dough-like SC material directly after the kneading, had no stickiness and gave excellent handling property.

Then, this acrylic BMC was extruded into sheet shape in the same manner as in Example 18. The viscosity of the BMC was too high, share heat was accumulated, and the temperature of the BMC rose to 80° C.

When this sheet shaped acrylic EM was left in atmosphere at 23° C., it was not cured in 2 months and extremely excellent storage stability was shown.

This sheet shaped acrylic BMC was aged at room temperature for 1 hour for completion of thickening, then, cut and filled in an amount of 700 g into a flat plate mold of 200 m square, and acrylic artificial marble of 200 mm square and 10 mm thickness was obtained in the same manner as in Example 1. The evaluation results are shown in Table 5.

EXAMPLE 25

Acrylic BMC was obtained in the same manner as in Example 18 except that the polymer powder (P-13) was used alone as the thickening agent as shown in Table 5 (kneading temperature: 25° C.). The resulted acrylic BMC was sticky semi-dough-like BMC directly after the kneading.

Then, this acrylic BMC was extruded into sheet shape in the same manner as in Example 18. The temperature of the extruded BMC was 50° C. or less, however, the extruded material was soft and had stickiness. Aging for 16 hours at room temperature was required for thickening this BMC extruded into sheet shape into condition of no stickiness. This sheet shaped B after aging had slightly changed size, however, kept the sheet shape.

This sheet shaped acrylic BMC aged was cut and filled in an amount of 700 g into a flat plate mold of 200 mm square, and acrylic artificial marble of 200 mm square and 10 mm thickness was obtained in the same manner as in Example 1. The evaluation results are shown in Table 5.

EXAMPLE 26

Acrylic BMC was kneaded, formed into sheet shape, then, molded in the same manner as in Example 18 except that the composition of the acrylic BMC was changed as shown in Table 6, to obtain acrylic artificial marble. The evaluation results are shown in Table 6.

EXAMPLE 27

Acrylic BMC was kneaded, formed into sheet shape, then, molded in the same manner as in Example 19 except that the composition of the acrylic BMC was changed as shown in Table 6, to obtain granite-like acrylic artificial marble. The evaluation results are shown in Table 6.

EXAMPLES 28 to 29

Acrylic BMC was kneaded, formed into sheet shape, then, molded in the same manner as in Example 18 except that the composition of the acrylic BMC was changed as shown in Table 6, to obtain acrylic artificial marble. The evaluation results are shown in Table 6.

EXAMPLE 30

Acrylic BMCs was kneaded, formed into sheet shape, then, molded in the same manner as in Example 19 except that the composition of the acrylic BMC was changed as shown in Table 6, to obtain granite-like acrylic artificial marble. The evaluation results are shown in Table 6.

EXAMPLE 31

Acrylic BMC was obtained in the same manner as in Example 18 except that the polymer powder (P-15) was used alone as the thickening agent and other composition was changed to a composition shown in Table 6 (kneading temperature: 25° C.). The resulted acrylic M was sticky semi-dough-like BMC directly after the kneading.

Then, this acrylic BMC was extruded into sheet shape in the same manner as in Example 18. The temperature of the extruded BMC was 50° C. or less, however, the extruded material was soft and had stickiness. Aging for 16 hours at roan temperature was required for thickening this BMC extruded into sheet shape into condition of no stickiness. This sheet shaped BMC after aging had slightly changed size, however, kept the sheet shape.

This sheet shaped acrylic B aged was cut and filled in an amount of 700 g into a flat plate mold of 200 m square, and acrylic artificial marble of 200 mm square and 10 mm thickness was obtained in the same manner as in Example 1. The evaluation results are shown in Table 6.

EXAMPLE 32

Acrylic BMC was kneaded, for into sheet shape, then, molded in the same manner as in Example 18 except that the composition of the acrylic BMC was changed as shown in Table 6, to obtain acrylic artificial marble. The evaluation results are shown in Table 7.

EXAMPLE 33

Acrylic BMC was kneaded, formed into sheet shape, then, molded in the same manner as in Example 19 except that the composition of the acrylic BMC was changed as shown in Table 7, to obtain granite-like acrylic artificial marble. The evaluation results are shown in Table 7.

EXAMPLES 34 to 36

Acrylic BMC was kneaded, formed into sheet shape, then, molded in the same manner as in Example 18 except that the composition of the acrylic BMC was changed as shown in Table 7, to obtain acrylic artificial marble. The evaluation results are shown in Table 7.

EXAMPLES 37

Acrylic BMC was kneaded, formed into sheet shape, then, molded in the same manner as in Example 19 except that the composition of the acrylic BMC was changed as shown in Table 7, to obtain granite-like acrylic artificial marble. The evaluation results are shown in Table 7.

EXAMPLE 38

Acrylic BMC was kneaded (kneading temperature: 25° C.), formed into sheet shape, then, molded in the same manner as in Example 18 except that the composition of the acrylic RE was changed as shown in Table 7, to obtain granite-like acrylic artificial marble. The evaluation results are shown in Table 7.

Comparative Examples 2 to 5

Acrylic BMC was kneaded in the same manner as in Example 18 except that the composition of the acrylic BMC was changed to a composition shown in Table 7. The resulted acrylic BMC was not thickened sufficiently directly after the kneading, and semi-liquid BMCs.

Then, this acrylic BMC was extruded into sheet shape in the same manner as in Example 18. The temperature of the extruded BMC was 30° C or less, however, the extruded material was sticky and too soft to keep the sheet shape. Aging for 24 hours or more at room tepperature was required for thickening the BMC extruded into sheet shape into condition of no stickiness.

These sheet shaped acrylic BMC aged was filled in an amount of 700 g into a flat plate mold of 200 mm square, and acrylic artificial marble of 200 mm square and 10 mm thickness was obtained in the same manner as in Example 1. The evaluation results are shown in Table 7.

EXAMPLE 39

8 parts of methyl methacrylate, 10 parts of isobonyl methacrylate and 10 parts of neopentyl glycol dimethacrylate as an acrylic monomer or an acrylic monomer mixture (A), 0.8 parts of 1,1-bis(t-butyl peroxy) 3,3,5-trimethylcyclohexane as a curing agent, 0.01 parts of 2,6-di-t-butyl-4-methylphenol (trade name: Sumilizer BHT, manufactured by Sumitomo Chemical Co., Ltd.) as a polymerization inhibitor, 0.15 parts of zinc stearate as an internal releasing agent, 61 parts of aluminum hydroxide as an inorganic filler (B), and 11 pats of the polymer powder (P-12) as a thickening agent were charged into a kneader, and kneaded for 10 minutes with passing cooling water of 25° C. through the jacket of the kneader to obtain an acrylic BMC. The resulted acrylic BMC was thickened to become a dough-like material even directly after the kneading, had no stickiness and gave excellent handling property.

This acrylic BMC was left in atmosphere of 23° C. It was not cured even after 3 months or more, and extremely excellent storage stability was shown.

Acrylic artificial marble of 200 mm square and 10 mm thickness was obtained in the same manner as in Example 1 using this acrylic BMC. The evaluation results are shown in Table 8.

EXAMPLES 40 to 42

Acrylic BMC was obtained in the same manner as in Example 39 except that conditions shown in Table 8 were used, and acrylic artificial marble of 200 mm square and 10 mm thickness was obtained in the same manner as in Example 1. The evaluation results are shown in Table 8.

Comparative Example 6

Acrylic BMC was obtained in the same manner as in Example 39 except that conditions shown in Table 8 were used. In the column of curing agents in the table, "Perbutyl O" represents t-butyl peroxy-2-ethyl hexanoate (trade name: Perbutyl O, manufactured by NOF Corp.).

This acrylic BMC was not thickened directly after the kneading and in the form of semi-liquid, and had stickiness and exhibited extremely poor handling property. It was necessary to further age this BMC at 60° C. for 24 hours or more for thickening this acrylic BMC into a dough-like material.

Artificial marble of 200 mm square and 10 mm thickness was obtained in the same manner as in Example 1 (however, the mold temperature was 110° C.) using the acrylic BMC after the aging. The molded article had a pin-hole on the surface and appearance thereof was poor. The evaluation results are shown in Table 8.

Comparative Example 7

Acrylic BMC was obtained in the same manner as in Example 39 except that conditions shown in Table 8 were used. In the column of curing agents in the table, "Perbutyl D" represents di-t-butyl peroxide (trade name: Perbutyl D, manufactured by NOF Corp.).

This acrylic BMC was not thickened directly after the kneading and in the form of semi-liquid, and had stickiness and exhibited extremely poor handling property. It was necessary to further age this BMC at 60° C. for 24 hours or more for thickening this acrylic BMC into a dough-like material.

Artificial marble of 200 mm square and 10 mm thickness was obtained in the same manner as in Example 1 (however, the mold temperature was 140° C. and the molding time was 20 minutes) using the acrylic BMC after the aging. The molded article had a pinhole on the surface and appearance thereof was poor. The evaluation results are shown in Table 8.

Comparative Example 8

Acrylic BMC was obtained in the same manner as in Example 39 except that conditions shown in Table 8 were used. In the column of curing agents in the table, "Perbutyl D" represents dicumyl peroxide (trade name: Perbutyl D, manufactured by NOF Corp.).

This acrylic BMC was not thickened directly after the kneading and in the form of semi-liquid, and had stickiness and exhibited extremely poor handling property. It was necessary to further age this BMC at 60° C. for 24 hours or more for thickening this acrylic BMC into a dough-like material.

Artificial marble of 200 mm square and 10 mm thickness was obtained in the same manner as in Example 1 (however, the mold temperature was 120 °C. and the molding time was 30 minutes) using the acrylic BMC after the aging. The molded article had a pinhole on the surface and appearance thereof was poor. The evaluation results are shown in Table 8.

EXAMPLE 43

13 parts of methyl methacrylate and 15 parts of neopentyl glycol dimethacrylate as an acrylic monomer or an acrylic monomer mixture (A), 0.8 parts of 1,1-bis(t-butyl peroxy) 3,3,5-trimethylcyclohexane as a curing agent, 0.01 parts of 2,6-di-t-butyl-4-methylphenol (trade name: Sumilizer BHT, manufactured by Sumitomo Chemical Co., Ltd.) as a polymerization inhibitor, 0.15 parts of zinc stearate as an internal releasing agent, 52 parts of aluminum hydroxide as an inorganic filler (B), 5 parts of an inorganic filler-containing resin particle (E) (2.5 parts of a white inorganic filler-containing resin particle and 2.5 part of a black inorganic filler-containing resin particle), and 15 pats of the polymer powder (P-11) as a thickening agent were charged into a kneader, and kneaded for 10 minutes with passing cooling water of 25° C. through the jacket of the kneader to obtain an acrylic BMC. The resulted acrylic BMC was thickened to become a dough-like material even directly after the kneading, had no stickiness and gave excellent handling property.

Granite-like acrylic artificial marble of 200 mm square and 10 mm thickness was obtained in the same manner as in Example 1 using this acrylic BMC. The evaluation results are shown in Table 8.

EXAMPLES 44 to 47

Acrylic BMC was obtained in the same manner as in Example 43 except that conditions shown in Table 8 were used, and granite-like acrylic artificial marble of 200 mm square and 10 m thickness was obtained in the same manner as in Example 1. The evaluation results are shown in Table 8.

Comparative Example 9

Acrylic BMC was obtained in the same manner as in Example 43 except that conditions shown in Table 8 were used. This acrylic BMC was not thickened directly after the kneading and in the form of semi-liquid, and had stickiness and exhibited extremely poor handling property. It was necessary to further age this BMC at 60° C. for 24 hours or more for thickening this acrylic BMC into a dough-like material.

Granite-like artificial marble of 200 mm square and 10 mm thickness was obtained in the same manner as in Example 1 (however, the mold temperature was 140° C. and the molding time was 20 minutes) using this acrylic BMC aged. The surface of the molded article had a pinhole and had uneven grain pattern, and the grain pattern was indefinite, and appearance thereof was poor. The evaluation results are shown in Table 8.

Comparative Example 10

Acrylic BMC was obtained in the same manner as in Comparative Example 7 except that the kneading temperature was 60° C. and the kneading time was 30 minutes. When this acrylic BMC was left in atmosphere of 23° C., it was cured in 2 weeks, and the storage stability thereof was poor.

Artificial marble of 200 mm square and 10 mm thickness was obtained in the same manner as in Example 1 (however, the mold temperature was 140° C. and the molding time was 20 minutes) using this acrylic BMC after the aging. The evaluation results are shown in Table 8.

Comparative Example 11

Acrylic BMC was obtained in the same manner as in Comparative Example 9 except that the kneading temperature was 60° C. and the kneading time was 30 minutes. When this acrylic BMC was left in atmosphere of 23° C., it was cured in 2 weeks, and the storage stability thereof was poor.

Artificial marble of 200 mm square and 10 mm thickness was obtained in the same manner as in Example 1 (however, the mold temperature was 140° C. and the molding time was 20 minutes) using the acrylic BMC after the aging. In the resulted artificial marble, the inorganic filler-containing resin particle as a material for grain pattern was dissolved, and granite-like appearance was not obtained, and appearance there of was poor. The other evaluation results are shown in Table 8.

EXAMPLE 48

12 parts of methyl methacrylate and 10 parts of neopentyl glycol dimethacrylate as an acrylic monomers or an acrylic monomer mixture (A) was thrown into a SUS vessel, to this was added 0.8 parts of 1,1-bis(t-butyl peroxy) 3,3,5-trimethylcyclohexane as a curing agent, 0.01 parts of 2,6-di-t-butyl-4-methylphenol as a polymerization inhibitor and 0.15 parts of zinc stearate as an internal releasing agent, then, the mixture was mixed for 2 minutes by a stirring blade driven by an air motor. This was continuously transferred to a hopper appended to a kneading extruder (KRC kneader manufactured by Kurimoto Ltd., Screw diameter=50 mm, L/D=13.7) by a gear pump manufactured by Kawasaki Heavy Industries Ltd. at a speed of 229.6 g/minute.

On the other hand, aluminum hydroxide as an inorganic filler (B) was thrown into a SUS vessel appended to a screw feeder 1 manufactured by KUMA ENGINEERING CO., LTD., and was thrown continuously into the hopper appended to the kneading extruder at a speed of 630 g/minute.

Further, the polymer powder (P-16) as a polymer powder (C) was thrown into a SUS vessel appended to a screw feeder 2 manufactured by KUMA ENGINEERING CO., LTD., and was thrown continuously into the hopper appended to the kneading extruder at a speed of 150 g/minute.

The temperature of a barrel of kneading extruder was controlled to 25° C., and the acrylic monomer or acrylic monomer mixture (A), inorganic filler (B) and polymer powder (C) were quantitatively thrown continuously according to the above-described method, the mixture was kneaded and simultaneously thickened in the kneading extruder and extruded through a die at the leading end of the kneading extruder, to continuously give an acrylic BMC shaped material in the form of a sheet of 85 mm width and 25 mm thickness at a speed of 60 kg/h. The time during which the material stayed in the kneading extruder was about 4 minutes. The temperature of the extruded BMC was 60° C. or less, and the extrusion into sheet shape was possible without problem. The resulted sheet shape acrylic BMC was a BMC having no stickiness and providing excellent handling property even directly after discharge from the die at the leading end of the extruder.

Then, acrylic artificial marble of 200 mm square and 10 mm thickness was obtained in the same manner as in Example 1 using the acrylic BMC. The evaluation results are shown in Table 9.

EXAMPLE 49

Kneading and extruding was continuously conducted in the same manner as in Example 48 except that the composition of the acrylic BMC was changed to a composition shown in Table 9, the acrylic monomer or acrylic monomer mixture (A) was fed at a speed of 575 g/minute, the inorganic filler (B) was fed at a speed of 1525 g/minute and the polymer powder (C) was fed at a speed of 400 g/minute, the temperature of the barrel of the kneading extruder was changed to 40° C., and the time during which the material stayed in kneading extruder was changed to 1 minute.

An acrylic BMC in the form of a sheet of 85 mm width and 25 mm thickness was obtained continuously at a speed of 150 kg/h through the die at the leading end of the kneading extruder. The temperature of the extruded BMC was 60° C. or less, and the extrusion into sheet shape was possible without problem. The resulted sheet shape acrylic BMC was a BMC having no stickiness and providing excellent handling property even directly after discharge from the die at the leading end of the extruder.

Then, acrylic artificial marble of 10 mm thickness was obtained in the same manner as in Example 1 using this acrylic BMC. The evaluation results are shown in Table 9.

Comparative Example 12

Kneading and extruding was continuously conducted in the same manner as in Example 48 except that a solution composed of 16 parts of methyl methacrylate, 6 parts of trimethylolpropane trimethacrylate, 0.2 parts of t-butyl peroxy-2-ethyl hexanoate, 0.01 part of 2,6-di-t-butyl-4-metylphenol and 0.15 parts of zinc stearate was fed at a speed of 223.6 g/minute, aluminum hydroxide was fed at a speed of 650 g/minute and the polymer powder (P-26) was fed at a speed of 130 g/minute, as the components to be thrown continuously into the kneading extruder.

The acrylic BMC extruded from the die at the leading end of the kneading extruder was not thickened and in the form of semi-liquid, and had stickiness and exhibited extremely poor handling property, consequently, sheet shape was not obtained. It was necessary to further age this BMC at 60° C. for 24 hours or more for thickening this acrylic BMC into a dough-like material.

Artificial marble of 200 mm square and 10 mm thickness was obtained in the same manner as in Example 1 (however, the mold temperature was 110° C.) using the acrylic BMC after the aging. The surface of the molded article had a pinhole, and appearance thereof was poor. The evaluation results are shown in Table 9.

Comparative Example 13

Kneading and extruding was continuously conducted in the same manner as in Example 48 except that a solution composed of 7.5 parts of methyl methacrylate, 7.5 parts of trimethylolpropane trimethacrylate, 0.2 parts of di-t-butyl peroxide, 0.01 part of 2,6-di-t-butyl-4-metylphenol and 0.15 parts of zinc stearate was fed at a speed of 153.6 g/minute, aluminum hydroxide was fed at a speed of 620 g/minute and the polymer powder (P-27) was fed at a speed of 230 g/minute, as the components to be thrown continuously into the kneading extruder.

The acrylic BMC extruded from the die at the leading end of the kneading extruder was not thickened and in the form of semi-liquid, and had stickiness and exhibited extremely poor handling property, consequently, sheet shape was not obtained. It was necessary to further age this BMC at 60° C. for 24 hours or more for thickening this acrylic BMC into a dough-like material.

Artificial marble of 200 mm square and 10 mm thickness was obtained in the same manner as in Example 1 using the acrylic BMC after the aging. The surface of the molded article had a pinhole, and appearance thereof was poor. The evaluation results are shown in Table 9.

Comparative Example 14

Kneading and extruding was continuously conducted in the same manner as in Example 48 except that a solution composed of 10 parts of ethylene glycol dimethacrylate, 10 parts of trimethylolpropane trimethacrylate, 0.2 parts of dicumyl peroxide, 0.01 part of 2,6-di-t-butyl-4-metylphenol and 0.15 parts of zinc stearate was fed at a speed of 203.6 g/minute, aluminum hydroxide was fed at a speed of 600 g/minute and the polymer powder (P-28) was fed at a speed of 200 g/minute, as the components to be thrown continuously into the kneading extruder.

The acrylic BMC extruded from the die at the leading end of the kneading extruder was not thickened and in the from of semi-liquid, and had stickiness and exhibited extremely poor handling property, consequently, sheet shape was not obtained. It was necessary to further age this BMC at 60° C. for 24 hours or more for thickening this acrylic BMC into a dough-like material.

Artificial marble of 200 mm square and 10 mm thickness was obtained in the same manner as in Example 1 using the acrylic BMC after the aging. The surface of the molded article had a pinhole, and appearance thereof was poor. The evaluation results are shown in Table 9.

Comparative Example 15

Kneading and extruding was continuously conducted in the same manner as in Example 48 except that the composition of the acrylic BMC was changed to a composition shown in Table 9, the acrylic monomer or acrylic monomer mixture (A) was fed at a speed of 120 g/minute, the inorganic filler (B) was fed at a speed of 600 g/minute and the polymer powder (C) was fed at a speed of 280 g/minute, the temperature of the barrel of the kneading extruder was changed to 95° C., and the time during which the material stayed in kneading extruder was changed to 2 minutes.

The acrylic BMC was tried to be extruded through the die at the leading end of the kneading extruder, the BMC was cured in the kneading extruder and could not be extruded.

EXAMPLE 50

13 parts of methyl methacrylate and 15 parts of neopentyl glycol dimethacrylate as an acrylic monomers or an acrylic monomer mixture (A) was thrown into a SUS vessel, to this was added 0.8 parts of 1,l-bis(t-butyl peroxy) 3,3,5-trimethylcyclohexane as a curing agent, 0.01 parts of 2,6-di-t-butyl-4-methylphenol as a polymerization inhibitor and 0.15 parts of zinc stearate as an internal releasing agent, then, the mixture was mixed for 2 minutes by a stirring blade driven by an air motor. This was continuously transferred to a hopper appended to a kneading extruder by a gear pump manufactured by Kawasaki Heavy Industries Ltd. at a speed of 289.6 g/minute.

On the other hand, aluminum hydroxide as an inorganic filler (B) was thrown into a SUS vessel appended to a screw feeder 1 manufactured by KUMA ENGINEERING CO., LTD., and was thrown continuously into the hopper appended to the kneading extruder at a speed of 520 g/minute.

Further, an inorganic filler-containing resin particle (E) composed of 25 parts of a white inorganic filler-containing resin particle and 25 part of a black inorganic filler-containing resin particle was thrown into a SUS vessel appended to a screw feeder 2 manufactured by KUMA ENGINEERING CO., LTD., and was thrown continuously into the hopper appended to the kneading extruder at a speed of 50 g/minute.

Further, the polymer powder (P-11) as a polymer powder (C) was thrown into a SUS vessel appended to a screw feeder 2 manufactured by KUMA ENGINEERING CO., LTD., and was thrown continuously into the hopper appended to the kneading extruder at a speed of 150 g/minute.

The temperature of a barrel of kneading extruder was controlled to 25° C., and the acrylic monomer or acrylic monomer mixture (A), inorganic filler (B), polymer powder (C) and the inorganic filler-containing resin particle (E) were quantitatively thrown continuously according to the above-described method, the mixture was kneaded and simultaneously thickened in the kneading extruder and extruded through a die at the leading end of the kneading extruder, to continuously give an acrylic BMC shaped material in the form of a sheet at a speed of 60 kg/h. The time during which the material stayed in the kneading extruder was about 4 minutes. The temperature of the extruded BMC was 60° C. or less, and the extrusion into sheet shape was possible without problem. The resulted sheet shape acrylic BMC was a BMC having no stickiness and providing excellent handling property even directly after discharge from the die at the leading end of the extruder.

Then, granite-like acrylic artificial marble of 10 m thickness was obtained in the same manner as in Example 1 using this acrylic BMC. The surface of the resulted granite-like artificial marble was a mirror-like surface having no defect at all, had extremely high gloss and had extremely clear grain pattern, and the grain pattern had not unevenness at all. Namely, the resulted marble was a granite-like artificial marble having extremely excellent design and having excellent appearance. The evaluation results are shown in Table 9.

EXAMPLE 51

Kneading and extruding was continuously conducted in the same manner as in Example 50 except that the composition of the acrylic BMC was changed to a composition shown in Table 9, the acrylic monomer or acrylic monomer mixture (A) was fed at a speed of 659 g/minute, the inorganic filler (B) was fed at a speed of 1749 g/minute, the polymer powder (C) was fed at a speed of 264 g/minute and the inorganic filler-containing resin particle (E) was fed at a temperature of 660 g/minute, the temperature of the barrel of the kneading extruder was changed to 45° C., and the time during which the material stayed in kneading extruder was changed to 30 seconds.

An acrylic BMC in the form of a sheet of 85 mm width and 25 mm thickness was obtained continuously at a speed of 200 kg/h through the die at the leading end of the kneading extruder. The temperature of the extruded BMC was 60° C. or less, and the extrusion into sheet shape was possible without problem. The resulted sheet shape acrylic BMC was a BMC having no stickiness and providing excellent handling property even directly after discharge from the die at the leading end of the extruder.

Then, granite-like acrylic artificial marble of 10 mm thickness was obtained in the same manner as in Example 1 using this acrylic BMC. The surface of the resulted granite-like artificial marble was a mirror-like surface having no defect at all, had extremely high gloss and had extremely clear grain pattern, and the grain pattern had not unevenness at all. Namely, the resulted marble was a granite-like artificial marble having extremely excellent design and having excellent appearance. The evaluation results are shown in Table 9.

EXAMPLE 52

Kneading and extruding was continuously conducted in the same manner as in Example 50 except that the composition of the acrylic BMC was changed to a composition shown in Table 9, the acrylic monomer or acrylic monomer mixture (A) was fed at a speed of 625 g/minute, the inorganic filler (B) was fed at a speed of 1275 g/minute, the polymer powder (C) was fed at a speed of 350 g/minute and the inorganic filler-containing resin particle (E) was fed at a temperature of 250 g/minute, the temperature of the barrel of the kneading extruder was changed to 40° C., and the time during which the material stayed in kneading extruder was changed to 1 minute.

An acrylic BMC in the form of a sheet of 85 mm width and 25 mm thickness was obtained continuously at a speed of 150 kg/h through the die at the leading end of the kneading extruder. The temperature of the extruded BMC was 60° C. or less, and the extrusion into sheet shape was possible without problem. The resulted sheet shape acrylic BMC was a BMC having no stickiness and providing excellent handling property even directly after discharge from the die at the leading end of the extruder.

Then, acrylic artificial marble of 10 mm thickness was obtained in the same manner as in Example 1 using this acrylic BMC. The evaluation results are shown in Table 9.

TABLE 3

| | acrylic monomer or acrylic monomer mixture (A) | | inorganic filler (B) | polymer powder (C) | | polymer powder (D) | | inorganic filler-containing resin particle (E) | curing agent | | coloring agent | internal releasing agent |
|---|---|---|---|---|---|---|---|---|---|---|---|---|
| | | | | kind | amount | kind | amount | | kind | amount | | |
| Ex. | | | | | | | | | | | | |
| 1 | MMA | 7 | 65 | P-1 | 15 | — | — | — | KD-1 | 0.5 | green: 0.36 blue: 0.06 black: 0.07 | 0.15 |
| | IBXMA | 3 | | | | | | | | | | |
| | NPGDMA | 10 | | | | | | | | | | |
| 2 | MMA | 7 | 61 | P-2 | 15 | — | — | — | KD-1 | 0.65 | green: 0.36 blue: 0.06 black: 0.07 | 0.15 |
| | IBXMA | 4 | | | | | | | | | | |
| | NPGDMA | 13 | | | | | | | | | | |
| 3 | syrup A1 (MMA/BDMA/ P-21 = 10/9/8) | 27 | 63 | P-3 | 10 | — | — | — | KD-1 | 0.5 | green: 0.36 blue: 0.06 black: 0.07 | 0.15 |
| 4 | MMA | 7 | 46 | P-1 | 10 | — | — | 20 | KD-1 | 0.65 | — | 0.15 |
| | IBXMA | 4 | | | | | | | | | | |
| | NPGDMA | 13 | | | | | | | | | | |
| 5 | syrup A1 (MMA/BDMA/ P-21 = 10/9/8) | 27 | 60 | P-2 | 8 | — | — | 5 | KD-1 | 0.5 | — | 0.15 |
| 6 | syrup A1 (MMA/BDMA/ P-21 = 10/9/8) | 27 | 46 | P-3 | 7 | — | — | 20 | KD-1 | 0.5 | — | 0.15 |
| 7 | syrup A1 (MMA/BDMA/ P-21 = 10/9/8) | 27 | 63 | P-4 | 10 | — | — | — | KD-1 | 0.5 | green: 0.36 blue: 0.06 black: 0.07 | 0.15 |
| 8 | syrup A1 (MMA/BDMA/ P-21 = 10/9/8) | 27 | 46 | P-4 | 7 | — | — | 20 | KD-1 | 0.5 | — | 0.15 |
| Co. Ex. | | | | | | | | | | | | |
| 1 | MMA | 7 | 46 | — | — | P-21 | 10 | 20 | KD-1 | 0.65 | — | 0.15 |
| | IBXMA | 4 | | | | | | | | | | |
| | NPGDMA | 13 | | | | | | | | | | |

TABLE 3-continued

| | | thickening property of BMC | property of molded article | | | |
|---|---|---|---|---|---|---|
| | | | gloss | surface smoothness | clearness of grain pattern | unevenness in grain pattern | hot water resistance |

| Ex. | | | | | | |
|---|---|---|---|---|---|---|
| 1 | ◎ | ◎ | ◎ | — | — | ○+ |
| 2 | ◎ | ◎ | ◎ | — | — | ○+ |
| 3 | ◎ | ◎ | ◎ | — | — | ◎ |
| 4 | ◎ | ◎ | ◎ | ◎ | ○ | ○+ |
| 5 | ◎ | ◎ | ◎ | ◎ | ○ | ○+ |
| 6 | ◎ | ◎ | ◎ | ◎ | ○ | ◎ |
| 7 | ◎ | ◎ | ◎ | — | — | ○ |
| 8 | ◎ | ◎ | ◎ | ◎ | ○ | ○ |

| Co. Ex. | | | | | | |
|---|---|---|---|---|---|---|
| 1 | × | ○ | × | × | × | ○+ |

MMA: methyl methacrylate  IBXMA: isobonyl methacrylate  NPGDMA: neopentyl glycol dimethacrylate  BDMA: 1,3-butylene glycol dimethacrylate

TABLE 4

| | acrylic monomer or acrylic monomer mixture (A) | | inorganic filler (B) | polymer powder (C) | | polymer powder (D) | | inorganic filler-containing resin particle (E) | curing agent | | coloring agent | internal releasing agent |
|---|---|---|---|---|---|---|---|---|---|---|---|---|
| | | | | kind | amount | kind | amount | | kind | amount | | |
| Ex. | | | | | | | | | | | | |
| 9 | syrup A1 (MMA/BDMA/ P-21 = 10/9/8) | 27 | 61 | P-5 | 12 | — | — | — | KD-1 | 0.5 | green: 0.36 blue: 0.06 black: 0.07 | 0.15 |
| 10 | syrup A1 (MMA/BDMA/ P-21 = 10/9/8) | 27 | 61 | P-7 | 12 | — | — | — | KD-1 | 0.5 | green: 0.36 blue: 0.06 black: 0.07 | 0.15 |
| 11 | syrup A1 (MMA/BDMA/ P-21 = 10/9/8) | 27 | 63 | P-8 | 10 | — | — | — | KD-1 | 0.5 | green: 0.36 blue: 0.06 black: 0.07 | 0.15 |
| 12 | MMA IBXMA NPGDMA | 7 4 13 | 61 | P-9 | 15 | — | — | — | KD-1 | 0.65 | green: 0.36 blue: 0.06 black: 0.07 | 0.15 |
| 13 | MMA IBXMA NPGDMA | 7 4 13 | 46 | P-6 | 10 | — | — | 20 | KD-1 | 0.65 | — | 0.15 |
| 14 | MMA IBXMA NPGDMA | 7 4 13 | 46 | P-7 | 10 | — | — | 20 | KD-1 | 0.65 | — | 0.15 |
| 15 | syrup A1 (MMA/BDMA/ P-21 = 10/9/8) | 27 | 46 | P-8 | 7 | — | — | 20 | KD-1 | 0.5 | — | 0.15 |
| 16 | MMA IBXMA NPGDMA | 7 4 13 | 46 | P-10 | 10 | — | — | 20 | KD-1 | 0.65 | — | 0.15 |
| 17 | MMA IBXMA NPGDMA | 7 4 13 | 46 | P-11 | 10 | — | — | 20 | KD-1 | 0.65 | — | 0.15 |

| | thickening property of BMC | property of molded article | | | |
|---|---|---|---|---|---|
| | | gloss | surface smoothness | clearness of grain pattern | unevenness in grain pattern | hot water resistance |
| Ex. | | | | | | |
| 9 | ◎ | ◎ | ◎ | — | — | ◎ |
| 10 | ◎ | ◎ | ◎ | — | — | ◎ |
| 11 | ◎ | ◎ | ◎ | — | — | ◎ |
| 12 | ◎ | ◎ | ◎ | — | — | ○+ |

TABLE 4-continued

| | | | | | | | |
|---|---|---|---|---|---|---|---|
| 13 | ◎ | ◎ | ◎ | ◎ | ◎ | ◎ | ◎ |
| 14 | ◎ | ◎ | ◎ | ◎ | ◎ | ◎ | ◎ |
| 15 | ◎ | ◎ | ◎ | ◎ | ◎ | ○ | ◎ |
| 16 | ◎ | ◎ | ◎ | ◎ | ◎ | ○ | ○ + |
| 17 | ◎ | ◎ | ◎ | ◎ | ◎ | ◎ | ○ |

MMA: methyl methacrylate IBXMA: isobonyl methacrylate NPGDMA: neopentyl glycol dimethacrylate BDMA: 1,3-butylene glycol dimethacrylate

TABLE 5

| | acrylic monomer or acrylic monomer mixture (A) | | inorganic filler (B) | polymer powder (C) | | | | inorganic filler-containing resin particle (E) | curing agent | | internal releasing agent |
|---|---|---|---|---|---|---|---|---|---|---|---|
| | | | | kind | amount | kind | amount | | kind | amount | |
| Ex. | | | | | | | | | | | |
| 18 | MMA | | 15 | 61 | P-11 | 8 | P-13 | 3 | — | Perhexa 3M | 0.8 | 0.15 |
| | NPGDMA | | 13 | | | | | | | | | |
| 19 | MMA | | 7 | 51 | P-11 | 6 | P-13 | 3 | 20 | Perhexa 3M | 0.8 | 0.15 |
| | BDMA | | 13 | | | | | | | | | |
| 20 | syrup A2 (MMA/NPGDMA/ P-21 = 14/6/11) | | 31 | 61 | P-12 | 6 | P-14 | 2 | — | Perhexa 3M | 0.8 | 0.15 |
| 21 | syrup A2 (MMA/NPGDMA/ P-21 = 14/6/11) | | 31 | 61 | P-11 | 4 | P-13 | 4 | — | Perhexa 3M | 0.8 | 0.15 |
| 22 | syrup A2 (MMA/NPGDMA/ P-21 = 14/6/11) | | 31 | 61 | P-12 | 2 | P-13 | 6 | — | Perhexa 3M | 0.8 | 0.15 |
| 23 | syrup A3 (MMA/BDMA/ P-21 = 8/7/7) | | 22 | 53 | P-11 | 3 | P-13 | 2 | 20 | Perhexa 3M | 0.8 | 0.15 |
| 24 | MMA | | 15 | 61 | P-11 | 11 | — | — | — | Perhexa 3M | 0.8 | 0.15 |
| | NPGDMA | | 13 | | | | | | | | | |
| 25 | MMA | | 15 | 61 | — | — | P-13 | 11 | — | Perhexa 3M | 0.8 | 0.15 |
| | NPGDMA | | 13 | | | | | | | | | |

| | physical property of BMC | | | | property of molded article | | | |
|---|---|---|---|---|---|---|---|---|
| | thickening property | extrusion shaping property | shape stability after shaping | storage stability | gloss | surface smoothness | clearness of grain pattern | unevenness in grain pattern |
| Ex. | | | | | | | | |
| 18 | ◎ | ◎ | ◎ | ◎ | ◎ | ◎ | — | — |
| 19 | ◎ | ◎ | ◎ | ◎ | ◎ | ◎ | ◎ | ◎ |
| 20 | ◎ | ◎ | ◎ | ◎ | ◎ | ◎ | — | — |
| 21 | ◎ | ◎ | ◎ | ◎ | ◎ | ◎ | — | — |
| 22 | ◎ | ◎ | ◎ | ◎ | ◎ | ◎ | — | — |
| 23 | ◎ | ◎ | ◎ | ◎ | ◎ | ◎ | ◎ | ◎ |
| 24 | ◎ | ○ | ◎ | ○ + | ◎ | ◎ | — | — |
| 25 | ○ | ◎ | ○ | ◎ | ◎ | ◎ | — | — |

MMA: methyl methacrylate NPGDMA: neopentyl glycol dimethacrylate BDMA: 1,3-butylene glycol dimethacrylate

TABLE 6

| | acrylic monomer or acrylic monomer mixture (A) | | inorganic filler (B) | polymer powder (C) | | | | inorganic filler-containing resin particle (E) | curing agent | | internal releasing agent |
|---|---|---|---|---|---|---|---|---|---|---|---|
| | | | | kind | amount | kind | amount | | kind | amount | |
| Ex. | | | | | | | | | | | |
| 26 | MMA | | 15 | 61 | P-11 | 8 | P-15 | 3 | — | Perhexa 3M | 0.8 | 0.15 |
| | NPGDMA | | 13 | | | | | | | | | |
| 27 | MMA | | 7 | 51 | P-11 | 6 | P-15 | 3 | 20 | Perhexa 3M | 0.8 | 0.15 |
| | BDMA | | 13 | | | | | | | | | |

TABLE 6-continued

| | | | | | | | | | | | |
|---|---|---|---|---|---|---|---|---|---|---|---|
| 28 | syrup A2 (MMA/NPGDMA/ P-21 = 14/6/11) | 31 | 61 | P-11 | 4 | P-15 | 4 | — | Perhexa 3M | 0.8 | 0.15 |
| 29 | syrup A2 (MMA/NPGDMA/ P-21 = 14/6/11) | 31 | 61 | P-12 | 2 | P-15 | 6 | — | Perhexa 3M | 0.8 | 0.15 |
| 30 | syrup A2 (MMA/NPGDMA/ P-21 = 14/6/11) | 22 | 53 | P-11 | 3 | P-15 | 2 | 20 | Perhexa 3M | 0.8 | 0.15 |
| 31 | MMA NPGDMA | 15 13 | 61 | — | — | P-15 | 11 | — | Perhexa 3M | 0.8 | 0.15 |

| | physical property of BMC | | | | property of molded article | | | |
|---|---|---|---|---|---|---|---|---|
| | thickening property | extrusion shaping property | shape stability after shaping | storage stability | gloss | surface smoothness | clearness of grain pattern | unevenness in grain pattern |
| Ex. | | | | | | | | |
| 26 | ⊙ | ⊙ | ⊙ | ⊙ | ⊙ | ⊙ | — | — |
| 27 | ⊙ | ⊙ | ⊙ | ⊙ | ⊙ | ⊙ | ⊙ | ⊙ |
| 28 | ⊙ | ⊙ | ⊙ | ⊙ | ⊙ | ⊙ | — | — |
| 29 | ⊙ | ⊙ | ⊙ | ⊙ | ⊙ | ⊙ | — | — |
| 30 | ⊙ | ⊙ | ⊙ | ⊙ | ⊙ | ⊙ | ⊙ | ⊙ |
| 31 | ○ | ⊙ | ○ | ⊙ | ⊙ | ⊙ | — | — |

MMA: methyl methacrylate  NPGDMA: neopentyl glycol dimethacrylate  BDMA: 1,3-butylene glycol dimethacrylate

TABLE 7

| | acrylic monomer or acrylic monomer mixture (A) | polymer inorganic filler (B) | polymer powder (C) | | filler-powder (D) | | inorganic containing resin particle (E) | curing agent | | internal releasing agent |
|---|---|---|---|---|---|---|---|---|---|---|
| | | | kind | amount | kind | amount | | kind | amount | |
| Ex. | | | | | | | | | | |
| 32 | MMA NPGDMA | 15 8 | P-11 | 8 | P-22 | 8 | — | Perhexa 3M | 0.8 | 0.15 |
| 33 | MMA BDMA | 7 8 | 51 | P-12 | 6 | P-22 | 8 | 20 | Perhexa 3M | 0.8 | 0.15 |
| 34 | syrup A4 (MMA/NPGDMA/ P-22 = 14/5/11) | 30 | 61 | P-11 | 5 | P-23 | 4 | — | Perhexa 3M | 0.8 | 0.15 |
| 35 | syrup A4 (MMA/NPGDMA/ P-22 = 14/5/11) | 30 | 61 | P-11 | 4 | P-24 | 5 | — | Perhexa 3M | 0.8 | 0.15 |
| 36 | syrup A4 (MMA/NPGDMA/ P-22 = 14/5/11) | 30 | 61 | P-12 | 3 | P-25 | 6 | — | Perhexa 3M | 0.8 | 0.15 |
| 37 | syrup A5 (MMA/BDMA/ P-22 = 14/4/10) | 28 | 46 | P-12 | 2 | P-24 | 4 | 20 | Perhexa 3M | 0.8 | 0.15 |
| 38 | MMA NPGDMA | 15 8 | 61 | P-11 | 16 | — | — | — | Perhexa 3M | 0.8 | 0.15 |
| Co. Ex. | | | | | | | | | | |
| 2 | MMA NPGDMA | 15 8 | 61 | — | — | P-23 | 16 | — | Perhexa 3M | 0.8 | 0.15 |
| 3 | MMA NPGDMA | 15 8 | 61 | — | — | P-23 | 16 | — | Perhexa 3M | 0.8 | 0.15 |
| 4 | syrup A4 (MMA/NPGDMA/ P-22 = 14/5/11) | 30 | 61 | — | — | P-24 | 9 | — | Perhexa 3M | 0.8 | 0.15 |
| 5 | styrup A4 (MMA/NPGDMA/ P-22 = 14/5/11) | 30 | 61 | — | — | P-22 | 9 | — | Perhexa 3M | 0.8 | 0.15 |

TABLE 7-continued

|  |  | physical property of BMC | | | | property of molded article | | | |
|---|---|---|---|---|---|---|---|---|---|
|  |  | thickening property | extrusion shaping property | shape stability after shaping | storage stability | gloss | surface smoothness | clearness of grain pattern | unevenness in grain pattern |
| Ex. | | | | | | | | | |
| | 32 | ◉ | ◉ | ◉ | ◉ | ◉ | ◉ | — | — |
| | 33 | ◉ | ◉ | ◉ | ◉ | ◉ | ◉ | ◉ | ◉ |
| | 34 | ◉ | ◉ | ◉ | ◉ | ◉ | ◉ | — | — |
| | 35 | ◉ | ◉ | ◉ | ◉ | ◉ | ◉ | — | — |
| | 36 | ◉ | ◉ | ◉ | ◉ | ◉ | ◉ | — | — |
| | 37 | ◉ | ◉ | ◉ | ◉ | ◉ | ◉ | ◉ | ◉ |
| | 38 | ◉ | ○ | ◉ | ○+ | ◉ | ◉ | — | — |
| Co. Ex. | | | | | | | | | |
| | 2 | × | ◉ | × | ◉ | ◉ | ◉ | — | — |
| | 3 | × | ◉ | × | ◉ | ◉ | ◉ | — | — |
| | 4 | × | ◉ | × | ◉ | ◉ | ◉ | — | — |
| | 5 | × | ◉ | × | ◉ | ◉ | ◉ | — | — |

MMA: methyl methacrylate  NPGDMA: neopentyl glycol dimethacrylate  BDMA: 1,3-butylene glycol dimethacrylate

TABLE 8

| | acrylic monomer or acrylic monomer mixture (A) | | inorganic filler (B) | polymer powder (C) | | polymer powder (D) | | inorganic filler-containing resin particle (E) | curing agent | | internal releasing agent | inhibitor |
|---|---|---|---|---|---|---|---|---|---|---|---|---|
| | | | | kind | amount | kind | amount | | kind | amount | | |
| Ex. | | | | | | | | | | | | | |
| 39 | MMA<br>IBXMA<br>NPGDMA | 8<br>10<br>10 | 61 | P-12 | 11 | — | — | — | Perhexa 3M | 0.8 | 0.15 | 0.01 |
| 40 | MMA<br>NPGDMA | 12<br>10 | 63 | P-16 | 15 | — | — | — | Perhexa 3M | 0.8 | 0.15 | 0.01 |
| 41 | MMA<br>NPGDMA<br>ST | 10<br>8<br>2 | 65 | P-18 | 15 | — | — | — | Perhexa 3M | 0.8 | 0.15 | 0.01 |
| 42 | MMA<br>CHMA<br>EDMA | 7<br>2<br>6 | 70 | P-19 | 15 | — | — | — | Perhexa 3M | 0.8 | 0.15 | 0.01 |
| Co. Ex. | | | | | | | | | | | | | |
| 6 | MMA<br>TMPTMA | 16<br>6 | 65 | — | — | P-26 | 13 | — | Perbutyl O | 0.2 | 0.15 | 0.01 |
| 7 | TMPTMA<br>ST | 7.5<br>7.5 | 62 | — | — | P-27 | 23 | — | Perbutyl D | 0.2 | 0.15 | 0.01 |
| 8 | EDMA<br>TMPTMA | 10<br>10 | 60 | — | — | P-28 | 20 | — | Percumyll D | 0.2 | 0.15 | 0.01 |
| Ex. | | | | | | | | | | | | | |
| 43 | MMA<br>NPGDMA | 13<br>15 | 52 | P-11 | 15 | — | — | 5 | Perhexa 3M | 0.8 | 0.15 | 0.01 |
| 44 | MMA<br>IBXMA<br>NPGDMA | 10<br>5<br>10 | 52 | P-11 | 13 | — | — | 10 | Perhexa 3M | 0.8 | 0.15 | 0.01 |
| 45 | MMA<br>IBXMA<br>NPGDMA | 7<br>4<br>13 | 46 | P-11 | 10 | — | — | 20 | Perhexa 3M | 0.8 | 0.15 | 0.01 |
| 46 | MMA<br>BDMA | 9<br>13 | 51 | P-17 | 7 | — | — | 20 | Perhexa 3M | 0.8 | 0.15 | 0.01 |
| 47 | MMA<br>NPGDMA | 7<br>13 | 53 | P-20 | 7 | — | — | 20 | Perhexa 3M | 0.8 | 0.15 | 0.01 |
| Co. Ex. | | | | | | | | | | | | | |
| 9 | TMPTMA<br>ST | 7.5<br>7.5 | 42 | — | — | P-27 | 23 | 20 | Perbutyl D | 0.2 | 0.15 | 0.01 |

TABLE 8-continued

| | | | | | | | | | | | | |
|---|---|---|---|---|---|---|---|---|---|---|---|---|
| 10 | TMPTMA | 7.5 | 62 | — | — | P-27 | 23 | — | Perbutyl D | 0.2 | 0.15 | 0.01 |
| | ST | 7.5 | | | | | | | | | | |
| 11 | TMPTMA | 7.5 | 42 | — | — | P-27 | 23 | 20 | Perbutyl D | 0.2 | 0.15 | 0.01 |
| | ST | 7.5 | | | | | | | | | | |

| | kneading condition | | physical property of BMC | | | property of molded article | | | |
|---|---|---|---|---|---|---|---|---|---|
| | temperature (° C.) | time (min.) | thickening property | storage stability | gloss | surface smoothness | clearness of grain pattern | unevenness in grain pattern |
| Ex. | | | | | | | | | |
| 39 | 25 | 10 | ◉ | ◉ | ◉ | ◉ | — | — |
| 40 | 25 | 10 | ◉ | ◉ | ◉ | ◉ | — | — |
| 41 | 25 | 10 | ◉ | ◉ | ◉ | ◉ | — | — |
| 42 | 25 | 10 | ◉ | ◉ | ○ | ◉ | — | — |
| Co. Ex. | | | | | | | | | |
| 6 | 25 | 10 | × | ○ | ○ | × | — | — |
| 7 | 25 | 10 | × | ◉ | ○ | × | — | — |
| 8 | 25 | 10 | × | ◉ | ○ | × | — | — |
| Ex. | | | | | | | | | |
| 43 | 25 | 10 | ◉ | ◉ | ◉ | ◉ | ◉ | ◉ |
| 44 | 25 | 10 | ◉ | ◉ | ◉ | ◉ | ◉ | ◉ |
| 45 | 25 | 10 | ◉ | ◉ | ◉ | ◉ | ◉ | ◉ |
| 46 | 25 | 10 | ◉ | ◉ | ◉ | ◉ | ○ | ○ |
| 47 | 25 | 10 | ◉ | ◉ | ◉ | ◉ | ◉ | ◉ |
| Co. Ex. | | | | | | | | | |
| 9 | 25 | 10 | × | ◉ | ○ | × | × | × |
| 10 | 60 | 30 | × | × | ○ | ◉ | — | — |
| 11 | 60 | 30 | × | × | ○ | ◉ | ×× | — |

MMA: methyl methacrylate CHMA: cyclohexyl methacrylate IBXMA: isobonyl methacrylate NPGDMA: neopentyl glycol dimethacrylate
BDMA: 1,3-butylene glycol dimethacrylate EDMA: ethylene glycol dimethacrylate TMPTMA: trimethylolpropane trimethacrylate ST: styrene

TABLE 9

| | acrylic monomer or acrylic monomer mixture (A) | | inorganic filler (B) | polymer powder (C) | | polymer powder (D) | | inorganic filler-containing resin particle (E) | curing agent | | internal releasing agent | inhibitor |
|---|---|---|---|---|---|---|---|---|---|---|---|---|
| | | | | kind | amount | kind | amount | | kind | amount | | |
| Ex. | | | | | | | | | | | | |
| 48 | MMA | 12 | 63 | P-16 | 15 | — | — | — | Perhexa 3M | 0.8 | 0.15 | 0.01 |
| | NPGDMA | 10 | | | | | | | | | | |
| 49 | MMA | 6.5 | 61 | P-11 | 16 | — | — | — | Perhexa 3M | 0.8 | 0.15 | 0.01 |
| | IBXMA | 6.5 | | | | | | | | | | |
| | NPGDMA | 10 | | | | | | | | | | |
| Co. Ex. | | | | | | | | | | | | |
| 12 | MMA | 16 | 65 | — | — | P-26 | 13 | — | Perbutyl O | 0.2 | 0.15 | 0.01 |
| | TMPTMA | 6 | | | | | | | | | | |
| 13 | TMPTMA | 7.5 | 62 | — | — | P-27 | 23 | — | Perbutyl D | 0.2 | 0.15 | 0.01 |
| | ST | 7.5 | | | | | | | | | | |
| 14 | EDMA | 10 | 60 | — | — | P-28 | 20 | — | Percumyl D | 0.2 | 0.15 | 0.01 |
| | TMPTMA | 10 | | | | | | | | | | |
| 15 | MMA | 7 | 60 | — | — | P-28 | 28 | — | Perhexa 3M | 0.8 | 0.15 | 0.01 |
| | NPGDMA | 5 | | | | | | | | | | |
| Ex. | | | | | | | | | | | | |
| 50 | MMA | 13 | 52 | P-11 | 15 | — | — | 5 | Perhexa 3M | 0.8 | 0.15 | 0.01 |
| | NPGDMA | 15 | | | | | | | | | | |
| 51 | MMA | 7.5 | 53 | P-11 | 8 | — | — | 20 | Perhexa 3M | 0.8 | 0.15 | 0.01 |
| | IBXMA | 4 | | | | | | | | | | |
| | BDMA | 7.5 | | | | | | | | | | |

TABLE 9-continued

| 52 | MMA 8<br>IBXMA 4<br>NPGDMA 13 | 51 | P-11 | 14 | — | — | 10 | Perhexa 3M | 0.8 | 0.15 | 0.01 |

| | kneading condition | | rate of kneading extrusion shaping (kg/h) | physical property of BMC | | | | property of molded article | | | |
|---|---|---|---|---|---|---|---|---|---|---|---|
| | temperature (° C.) | time (min.) | | thickening property | continuous kneading extrusion shaping property | shape stability after shaping | storage stability | gloss | surface smoothness | clearness of grain pattern | unevenness in grain pattern |
| Ex. | | | | | | | | | | | |
| 48 | 25 | 4 | 60 | ◎ | ○ | ◎ | ◎ | ◎ | ◎ | — | — |
| 49 | 40 | 1 | 150 | ◎ | ○ | ◎ | ◎ | ◎ | ◎ | — | — |
| Co. Ex. | | | | | | | | | | | |
| 12 | 25 | 4 | 60 | × | × | × | ○ | ○ | × | — | — |
| 13 | 25 | 4 | 60 | × | × | × | ◎ | ○ | × | — | — |
| 14 | 25 | 4 | 60 | × | × | × | ◎ | ○ | × | — | — |
| 15 | 95 | 2 | — | — | — | ×× | — | — | — | — | — |
| Ex. | | | | | | | | | | | |
| 50 | 25 | 4 | 60 | ◎ | ○ | ◎ | ◎ | ◎ | ◎ | ◎ | ◎ |
| 51 | 45 | 0.5 | 200 | ◎ | ○ | ◎ | ◎ | ◎ | ◎ | ◎ | ◎ |
| 52 | 40 | 1 | 150 | ◎ | ○ | ◎ | ◎ | ◎ | ◎ | ◎ | ◎ |

MMA: methyl methacrylate CHMA: cyclohexyl methacrylate IBXMA: isobonyl methacrylate NPGDMA: neopentyl glycol dimethacrylate BDMA: neopentyl glycol dimethacrylate EDMA: ethylene glycol methacrylate TMPTMA: trimethylolpropane trimethacrylate ST: styrene Thickening property of BMC
  ◎: It is thickened to be a dough-like material during kneading, no stickiness is recognized even directly after kneading, and handling property is extremely excellent.
  ○: It is a sticky semi-dough-like material directly after kneading, however, it becomes a non-sticky material providing excellent handling property by aging at room temperature for 16 hours.
  X: It is not thickened during kneading, and directly after kneading, it is semi-liquid and sticky, and handling property thereof is extremely poor. Aging at 60° C. for 24 hours or more is required for obtaining a dough-like BMC.
Extruding and shaping property of BMC
  ◎: The temperature of a BMC extruded is 50° C. or less, and extrusion into sheet shape is possible without problem.
  ○: A BMC can be extruded into sheet shape, however, viscosity thereof is high, share heat is accumulated, and the temperature of the BMC rises to 80° C.
Continuous extruding and shaping property of BMC
  ○: The temperature of a BMC extruded is 60° C. or less, and extrusion into sheet shape is possible without problem.
  X: A BMC extruded is not thickened, in the form of semi-solid and sticky, and handling property thereof is poor, and extrusion into sheet shape is impossible.
  XX: A BMC is cured in a kneading and extruding machine, and can not extruded.
Shape stability after shaping of BMC
  ◎: An acrylic BMC after aging keeps sheet shape before the aging intact.
  ○: A sheet-like E after aging keeps sheet shape thought size thereof varies slightly.
  X: An extrudate is too soft to keep sheet shape.

Storage stability of BMC
  ◎: It is not cured even after left for 3 months or more in atmosphere of 23° C., and storage stability is extremely excellent.
  ○: When it is left in atmosphere of 23° C., it is not cured in 2 months, and storage stability is extremely excellent.
  ○: When it is left in atmosphere of 23° C., it is not cured in 1 month, and storage stability is extremely excellent.
  X: When it is left in atmosphere of 23° C., it is cured in 2 weeks.
Gloss of molded article
  ◎: Gloss is extremely excellent.
  ○: Gloss is high.
  Δ: Gloss is recognized.
  X: Gloss is low.
Surface smoothness of molded article
  ◎: It has no pinhole at all, and surface smoothness is extremely high.
  ○: It has no pinhole, and surface smoothness is high.
  Δ: It has pinholes, and surface smoothness is low.
  X: It has a lot of pinholes, and surface smoothness is low.
Clearness of grain pattern of molded article
  ◎: It is extremely clear, and excellent in design very much.
  ○: It is clear, and excellent in design.
  Δ: Grain pattern is indefinite, and poor in design.
  X: Grain pattern is indefinite, and poor in design very much.
  XX: An inorganic filler-containing resin particle which is a material for grain pattern is dissolved, and granite-like appearance is not obtained, and appearance thereof is extremely poor.

Unevenness in grain pattern of molded article
⊚: It has no unevenness at all in grain pattern, and excellent in design very much.
○: It has no unevenness, and excellent in design.
Δ: It has unevenness, and poor in design.
X: It has significant unevenness, and poor in design very much.

Hot water resistance of molded article
⊚: Color change is extremely small.
○: Color change is fairly small.
○: Color change is small.
X: Color change is large.

Industrial applicability

As apparent from the above-described examples, there can be obtained an acrylic SMC or BMC which is thickened in a short period of time to provide acrylic artificial marble excellent in hot water resistance by using as a thickening agent a polymer powder which has specific bulk density and oil absorption and is obtained by emulsion polymerization using a reactive surfactant or emulsion polymerization using no surfactant, thickening speed can be controlled by using a specific thickening agent together, further, there can be obtained an acrylic SMC or BMC excellent in storage stability by kneading under specific conditions, and acrylic artificial marble produced by using this has excellent appearance and extremely excellent hot water resistance, and industrially is very useful.

What is claimed is:

1. An acrylic SMC or BMC comprising an acrylic monomer or acrylic monomer mixture (A), an inorganic filler (B) and a polymer powder (C) wherein the polymer power (C) has a bulk density in the range from 0.1 to 0.7 g/ml, an oil absorption of linseed oil in the range from 60 to 200 ml/100 g, a degree of swelling by methyl methacrylate is 16-fold or more and a specific surface area in the range from 1 to 100 $m^2/g$,
wherein the polymer powder (C) contains a polymer powder (C1) containing no surfactant and/or a polymer powder (C2) containing as a constituent component a reactive surfactant.

2. An acrylic SMC or BMC comprising an acrylic monomer or acrylic monomer mixture(A), an inorganic filler (B) and a polymer powder (C) wherein the polymer powder (C) has a bulk density in the range from 0.1 to 0.7 g/ml, an oil absorption of linseed oil in the range from 60 to 200 ml/100 g, a degree of swelling by methyl methacrylate is 16-fold or more and a specific surface area in the range from 1 to 100 $m^2/g$,
wherein the polymer powder (C) contains at least two components selected from a non-crosslinked polymer (C3) powder having a weight-average molecular weight in the range from 100,000 to 2,500,000, a noncrosslinked polymer powder (C4) having a weight-average molecular weight in the range from 2,500,000 to 5,000,000 and a crosslinked polymer powder (C5).

3. An acrylic SMC or BMC comprising an acrylic monomer or acrylic monomer mixture(A), an inorganic filler(B), a polymer powder (C) wherein the polymer power (C) has a bulk density in the range from 0.1 to 0.7 g/ml, an oil absorption of linseed oil in the range from 60 to 200 ml/100 g, a degree of swelling by methyl methacrylate is 16-fold or more and a specific surface area in the range from 1 to 100 $m^2/g$ and a polymer powder (D) having a specific surface area in the range from 0.01 $m^2/g$ to 1 $m^2/g$.

4. The acrylic SMC or BMC according to claim 1, further containing an inorganic filler-containing resin particle (E).

5. The acrylic SMC or BMC according to claim 1, wherein the average particle size of the polymer powder (C) is in the range from 1 to 250 μm.

6. The acrylic SMC or BMC according to claims 1, wherein the polymer powder (C) is a secondary agglomerate obtained by mutual agglomeration of a primary agglomerate.

7. The acrylic SMC or BMC according to claim 1, wherein the average particle size of the primary particle of the polymer powder (C) is from 0.03 to 1 μm.

8. The acrylic SMC or BMC according to claim 1, wherein the polymer powder (C) is obtained by emulsion polymerization.

9. The acrylic SMC or BMC according to claim 1, wherein the reactive surfactant contains 1 to 5 polymerizable functional groups in the molecule of the surfactant.

10. The acrylic SMC or BMC according to any of claims 1, wherein the polymer powder (C) is constituted of an acrylic polymer.

11. The acrylic SMC or BMC according to claims 1, wherein the acrylic monomer or acrylic monomer mixture (A) contains a polyfunctional acrylic monomer.

12. The acrylic SMC or ME according to claim 1, wherein the acrylic monomer or acrylic monomer mixture (A) contains neopentyl glycol dimethacrylate and/or 1,3-butylene glycol dimethacrylate.

13. A method for producing an acrylic SMC or BMC comprising mixing uniformly an acrylic monomer or acrylic monomer mixture (A), an inorganic filler (B), and a polymer powder (C) wherein the polymer powder (C) has a bulk density in the range from 0.1 to 0.7 g/ml, an oil absorption of linseed oil in the range from 60 to 200 ml/100 g, a degree of swelling by methyl methacrylate is 16-fold or more and a specific surface area in the range from 1 to 100 $m^2/g$, and thickening the mixture to give a dough-like material, then, extruding the material into a desired shape,
wherein as the polymer powder (C), at least two components selected from a non-crosslinked polymer powder (C3) having a weight-average molecular weight in the range from 100,000 to 2,500,000, a non-crosslinked polymer powder (C4) having a weight-average molecular weight in the range from 2,500,000 to 5,000,000 and a crosslinked polymer powder (C5) are used together.

14. The method for producing an acrylic SMC or BMC according to claim 13, wherein an inorganic filler-containing resin particle (E) is further used together with the components (A) to (C), and they are mixed uniformly and thickened to give a dough-like material, then, the material is extruded into a desired shape.

15. A method for producing an acrylic SMC or BMC comprising nursing uniformly an acrylic monomer or acrylic monomer mixture (A), an inorganic filler (B), a polymer powder (C) wherein the polymer powder (C) has a bulk density in the range from 0.1 to 0.7 g/ml, an oil absorption of linseed oil in the range from 60 to 200 ml/100 g, a degree of swelling by methyl methacrylate is 16-fold or more and a specific surface area in the range from 1 to 100 $m^2/g$ and a polymer powder (D) having a specific surface area in the range from 0.01 $m^2/g$ to 1 $m^2/g$, and thickening the mixture to give a dough-like material, then, extruding the material into a desired shape.

16. The method for producing an acrylic SMC or BMC according to claim 15, wherein an inorganic filler-containing resin particle (E) is further used together with the components (A) to (D), and they are mixed uniformly and thickened to give a dough-like material, then, the material is extruded into a desired shape.

17. A method for producing an acrylic SMC or BMC comprising kneading an acrylic monomer or acrylic monomer mixture (A), an inorganic filler (B), and a polymer powder (C) wherein the polymer powder (C) has a bulk density in the range from 0.1 to 0.7 g/ml, an oil absorption of linseed oil in the range from 60 to 200 ml/100 g, a degree of swelling by methyl methacrylate is 16-fold or more and a specific surface area in the range from 1 to 100 m$^2$/g, and thickening the mixture at a temperature in the range from 20 to 70° C. within 20 minutes.

18. The method for producing an acrylic SMC or BMC according to claim 17, wherein an inorganic filler-containing resin particle (E) is further used together with the components (A) to (C), and they are kneaded and thickened at a temperature in the range from 20 to 70° C. within 20 minutes.

19. A method for producing an acrylic SMC or BMC comprising mixing uniformly an acrylic monomer or acrylic monomer mixture (A), an inorganic filler (B), and a polymer powder (C) wherein the polymer powder (C) has a bulk density in the range from 0.1 to 0.7 g/ml, an oil absorption of linseed oil in the range from 60 to 200 ml/100 g, a degree of swelling by methyl methacrylate is 16-fold or more and a specific surface area in the range from 1 to 100 M$^2$/g, and thickening simultaneously the mixture at a temperature in the range from 20 to 70° C. to give a dough-like material before extruding the material within 20 minutes, to continuously obtain a desired shape.

20. The method for producing an acrylic SMC or BMC according to claim 19, wherein an inorganic filler-containing resin particle (E) is further used together with the components (A) to (C), and they are mixed uniformly and simultaneously thickened at a temperature in the range from 20 to 70° C. to give a dough-like material before extruding the material within 20 minutes, to continuously obtain a desired shape.

21. The method for producing an acrylic SMC or BMC according to claim 15, wherein the polymer powder (C) is obtained by emulsion polymerization.

22. The method for producing an acrylic SMC or BMC according to claim 15, wherein the average particle size of the polymer powder (C) is in the range from 1 to 250 μm.

23. The method for producing an acrylic SMC or BMC according to claim 15, wherein the polymer powder (C) is a secondary agglomerate obtained by mutual agglomeration of a primary agglomerate.

24. The method for producing an acrylic SMC or BMC according to claim 23, wherein the average particle size of the primary particle of the polymer powder (C) is from 0.03 to 1 μm.

25. The method for producing an acrylic SMC or BMC according to claim 15, wherein the polymer powder (C) is constituted of an acrylic polymer.

26. The method for producing an acrylic SMC or BMC according to claim 15, wherein the polymer powder (C) is constituted of an non-crosslinked polymer.

27. The method for producing an acrylic SMC or BMC according to claim 15, wherein the polymer powder (C) has core-shell structure.

28. The method for producing an acrylic SMC or BMC according to claim 15, wherein the acrylic monomer or acrylic monomer mixture (A) contains a polyfunctional acrylic monomer.

29. The method for producing an acrylic SMC or BMC according to claim 28, wherein the acrylic ionomer or acrylic monomer mixture (A) contains neopentyl glycol dimethacrylate and/or 1,3-butylene glycol dimethacrylate.

30. A method for producing acrylic artificial marble comprising curing with heating and compressing the acrylic SMC or BMC of claim 1.

31. A method for producing acrylic artificial marble comprising curing with heating and compressing the acrylic SMC or BMC of claim 4.

32. A method for producing acrylic artificial marble comprising curing with heating and compressing an acrylic SMC or BMC produced by the method of any of claim 13.

33. A thickening agent comprising a polymer powder (C2) which has a bulk density in the range from 0.1 to 0.7 g/ml, an oil absorption of lin-seed oil in the range from 60 to 200 ml/100 g, a degree of swelling by methyl methacrylate is 16-fold or more and a specific surface area in the range from 1 to 100 m$^2$/g, and contains as a constituent component a reactive surfactant.

34. A thickening agent comprising a polymer powder (C1) which has a bulk density in the range from 0.1 to 0.7 g/ml, an oil absorption of lin-seed oil in the range from 60 to 200 ml/100 g, a degree of swelling by methyl methacrylate is 16-fold or more and a specific surface area in the range from 1 to 100 m$^{2/}$g, and contains no reactive surfactant.

* * * * *